US012585827B2

(12) United States Patent
Khanal et al.

(10) Patent No.: US 12,585,827 B2
(45) Date of Patent: Mar. 24, 2026

(54) ARTWORK MANAGING METHOD, COMPUTER, AND PROGRAM

(71) Applicant: Wacom Co., Ltd., Saitama (JP)

(72) Inventors: Avinav Khanal, Duesseldorf (DE); Ute Kampmann, Duesseldorf (DE); Joss Daniel Giffard-Burley, Frome (GB); Michal Jelinek, Duesseldorf (DE)

(73) Assignee: Wacom Co., Ltd., Saitama (JP)

( * ) Notice: Subject to any disclaimer, the term of this patent is extended or adjusted under 35 U.S.C. 154(b) by 203 days.

(21) Appl. No.: 18/461,381

(22) Filed: Sep. 5, 2023

(65) Prior Publication Data

US 2023/0418984 A1    Dec. 28, 2023

Related U.S. Application Data

(63) Continuation of application No. PCT/JP2022/014311, filed on Mar. 25, 2022.

(30) Foreign Application Priority Data

Apr. 6, 2021    (JP) ................................. 2021-064893

(51) Int. Cl.
*G06F 21/64* (2013.01)
(52) U.S. Cl.
CPC .................................... *G06F 21/64* (2013.01)
(58) Field of Classification Search
CPC ........ G06F 21/64; G06Q 10/10; G06Q 50/01; G06Q 50/265; G06Q 2220/00; H04L 9/0643; H04L 9/3247; H04L 9/50; H04L 63/123
See application file for complete search history.

(56) References Cited

U.S. PATENT DOCUMENTS

| | | | | |
|---|---|---|---|---|
| 11,075,891 B1 * | 7/2021 | Long | .................... | H04L 9/3213 |
| 11,803,885 B2 * | 10/2023 | Chapman | ............. | H04L 9/0643 |
| 12,166,756 B2 * | 12/2024 | Novotny | ............. | H04L 63/0876 |

(Continued)

FOREIGN PATENT DOCUMENTS

| | | |
|---|---|---|
| EP | 3399441 A1 | 11/2018 |
| WO | 2017063075 A1 | 4/2017 |

OTHER PUBLICATIONS

T. Dobbs, A.A.-R. Nayeem, I. Cho, Z. Ras. Contemporary Art Authentication with Large-Scale Classification. Big Data Cogn. Comput. v.7, p. 162 (Year: 2023).*

(Continued)

*Primary Examiner* — Lynn D Feild
*Assistant Examiner* — Vladimir I Gavrilenko
(74) *Attorney, Agent, or Firm* — Seed Intellectual Property Law Group LLP

(57) ABSTRACT

An artwork managing method performed by a computer is provided. The computer receives a request for usage of first artwork, and generates a first decentralized identify (DID) document as a DID document including a first DID, which is a DID for identifying the first artwork, and including a second DID, which is a DID for identifying a first user requesting the usage of the first artwork. Also provided is a non-transitory program for causing the computer to perform the artwork management method. The method, computer, and program allow for robust management of information related to artwork using self-sovereign identify (SSI).

25 Claims, 29 Drawing Sheets

(56)  References Cited

U.S. PATENT DOCUMENTS

| | | | | |
|---|---|---|---|---|
| 12,418,420 | B2 * | 9/2025 | Nakamura | H04L 9/3247 |
| 2007/0247317 | A1 * | 10/2007 | Farrell | G06K 19/07381 |
| | | | | 340/572.3 |
| 2008/0149713 | A1 * | 6/2008 | Brundage | G07F 7/082 |
| | | | | 235/435 |
| 2019/0340607 | A1 * | 11/2019 | Lynn | G06Q 20/4014 |
| 2021/0075774 | A1 | 3/2021 | Murdoch et al. | |
| 2022/0311611 | A1 * | 9/2022 | Gaur | H04L 9/3213 |

OTHER PUBLICATIONS

S. Lyu, D. Rockmore, H. Farid. A digital technique for art authentication. PNAS, v. 101, p. 17006 (Year: 2004).*

International Search Report mailed Jun. 21, 2022, for International Patent Application No. PCT/JP2022/014311. (5 pages) (with English Translation).

W3C, "Decentralized Identifiers (DIDs) v1.0," Jul. 19, 2022, URL= https://www.w3.org/TR/did-core/, download date Sep. 4, 2023. (66 pages).

W3C, "Verifiable Credentials Data Model v1.1," Mar. 3, 2022, URL=https://www.w3.org/TR/vc-data-model/, download date Sep. 4, 2023. (73 pages).

Communication pursuant to Article 94(3) EPC, dated Jan. 10, 2025, for European Application No. 22 787 987.1-1218. (4 pages).

* cited by examiner

F I G . 1
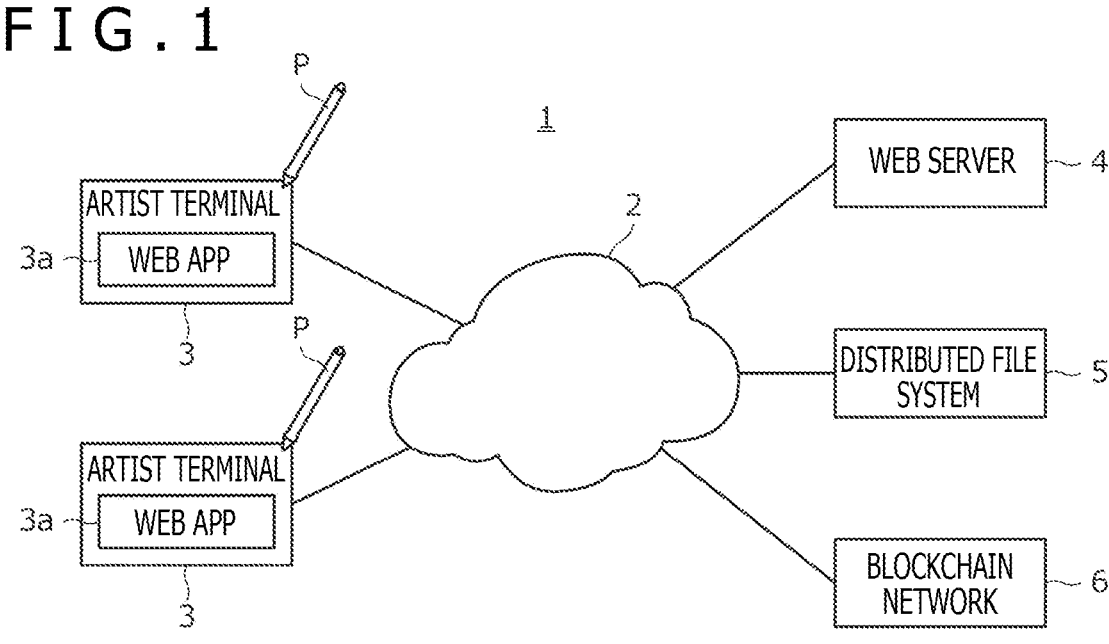
F I G . 2
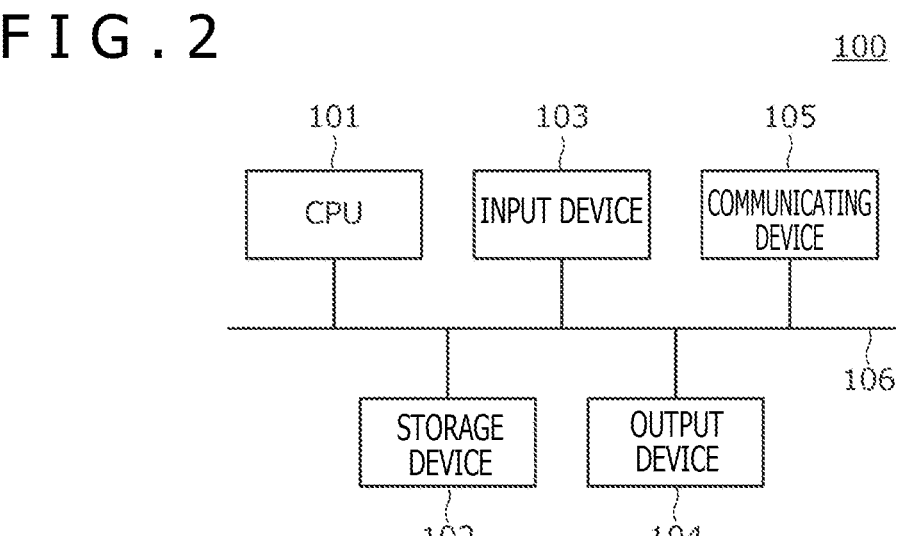

F I G . 3
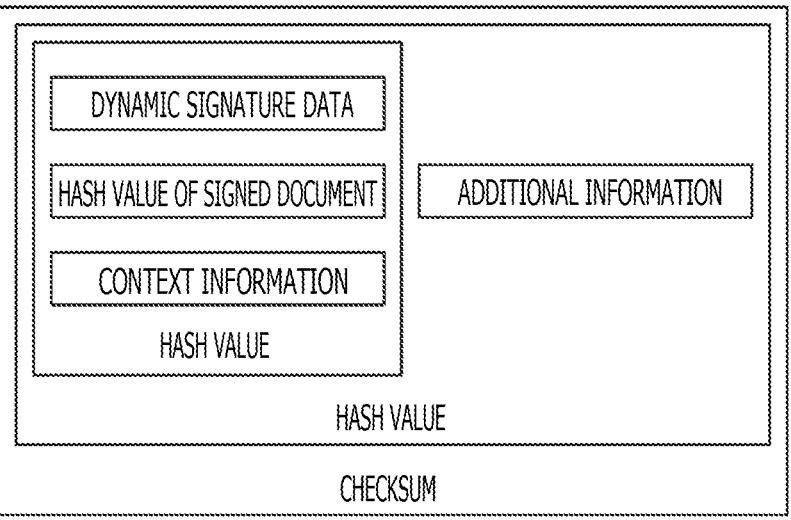

F I G . 4
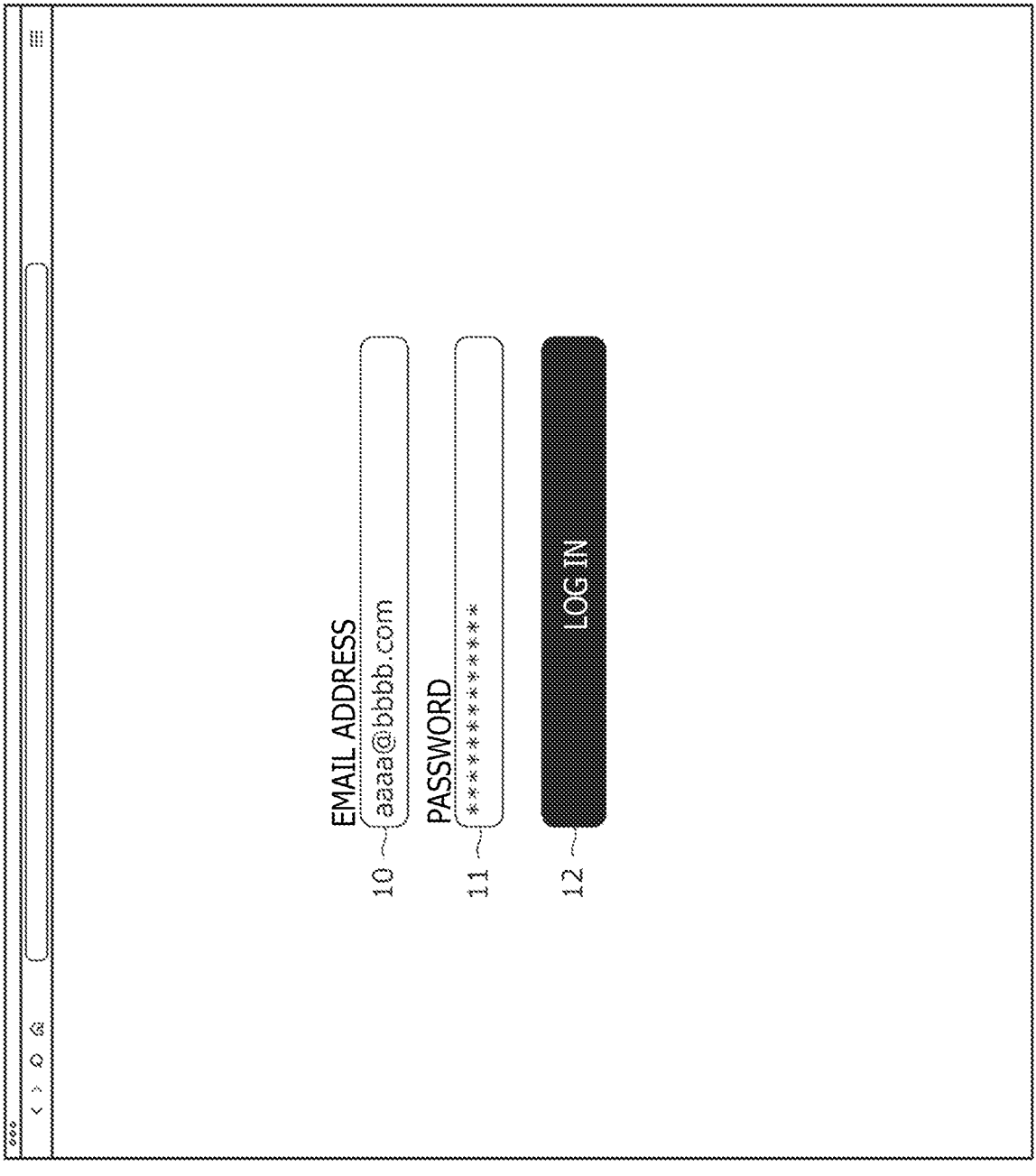

F I G . 7
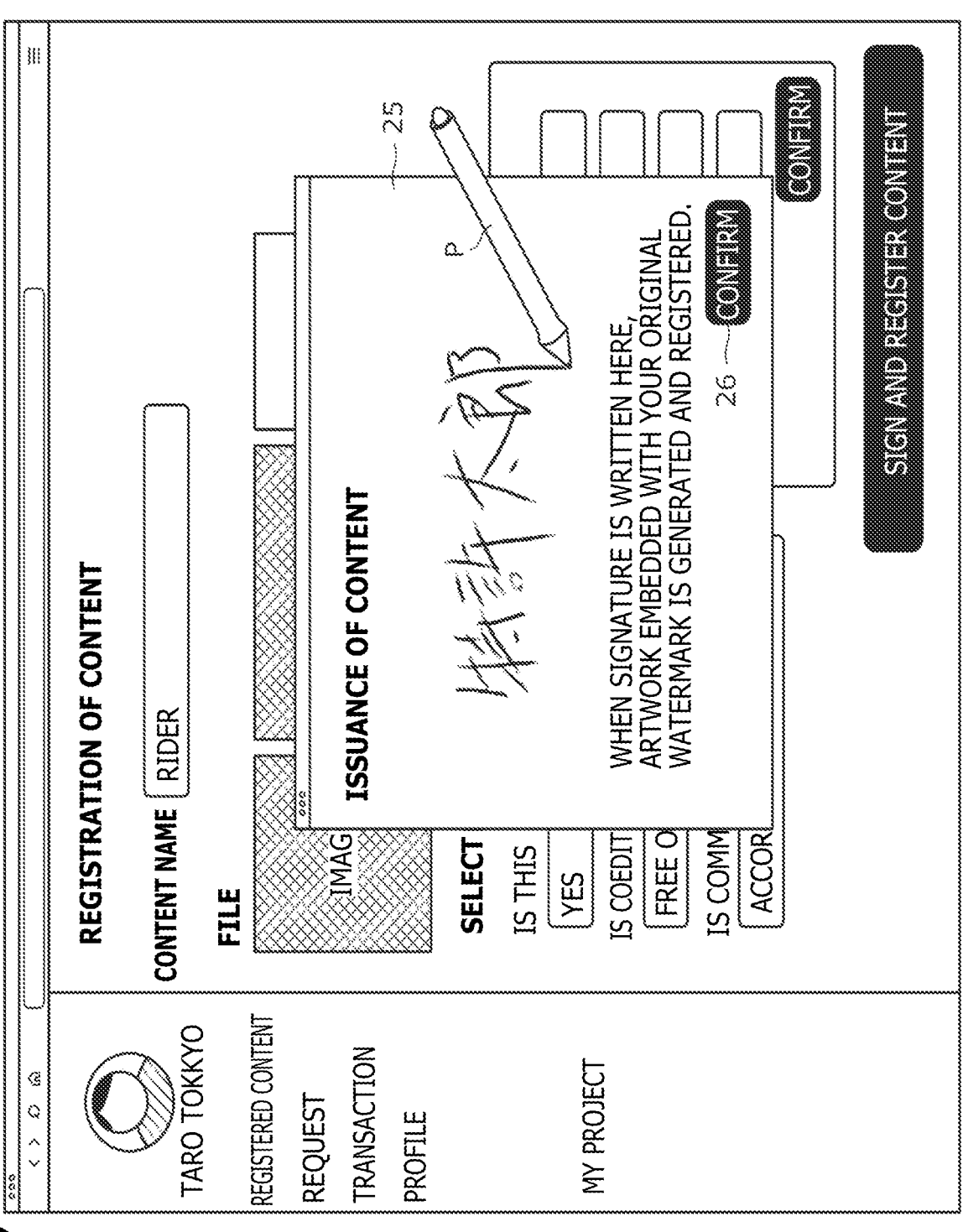

F I G . 8
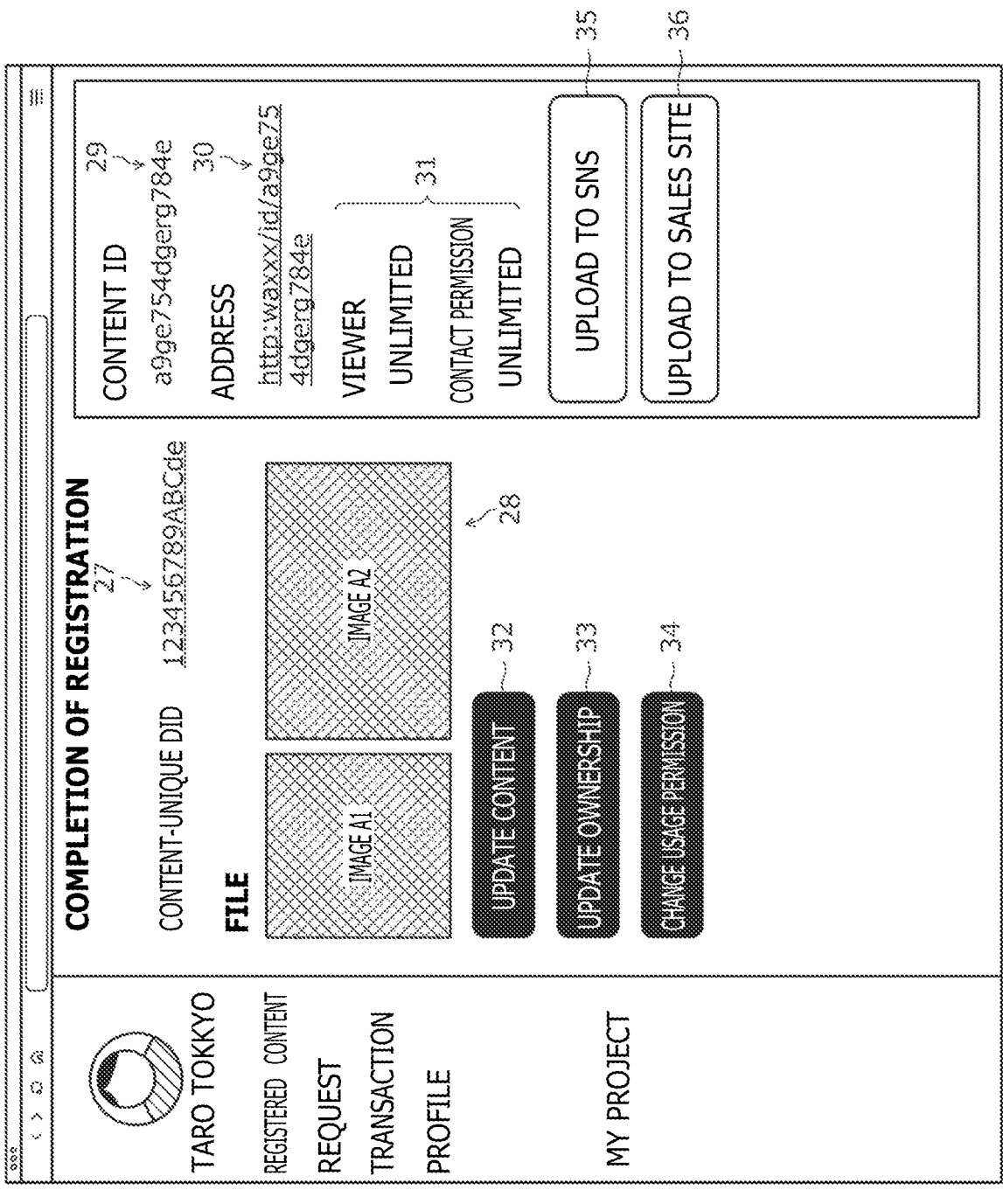

Figure 1:
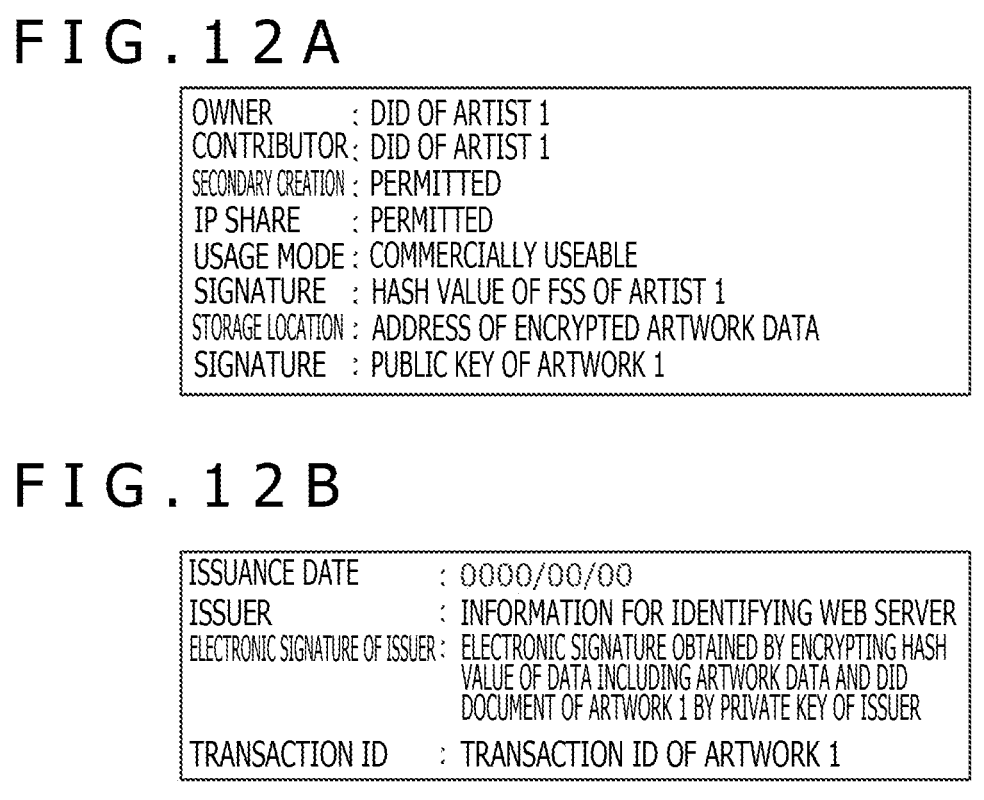

F I G . 1 2 A

```
OWNER          : DID OF ARTIST 1
CONTRIBUTOR : DID OF ARTIST 1
SECONDARY CREATION : PERMITTED
IP SHARE       : PERMITTED
USAGE MODE : COMMERCIALLY USEABLE
SIGNATURE    : HASH VALUE OF FSS OF ARTIST 1
STORAGE LOCATION : ADDRESS OF ENCRYPTED ARTWORK DATA
SIGNATURE    : PUBLIC KEY OF ARTWORK 1
```

F I G . 1 2 B

```
ISSUANCE DATE        : 0000/00/00
ISSUER               : INFORMATION FOR IDENTIFYING WEB SERVER
ELECTRONIC SIGNATURE OF ISSUER : ELECTRONIC SIGNATURE OBTAINED BY ENCRYPTING HASH
                       VALUE OF DATA INCLUDING ARTWORK DATA AND DID
                       DOCUMENT OF ARTWORK 1 BY PRIVATE KEY OF ISSUER
TRANSACTION ID       : TRANSACTION ID OF ARTWORK 1
```

F I G . 1 3

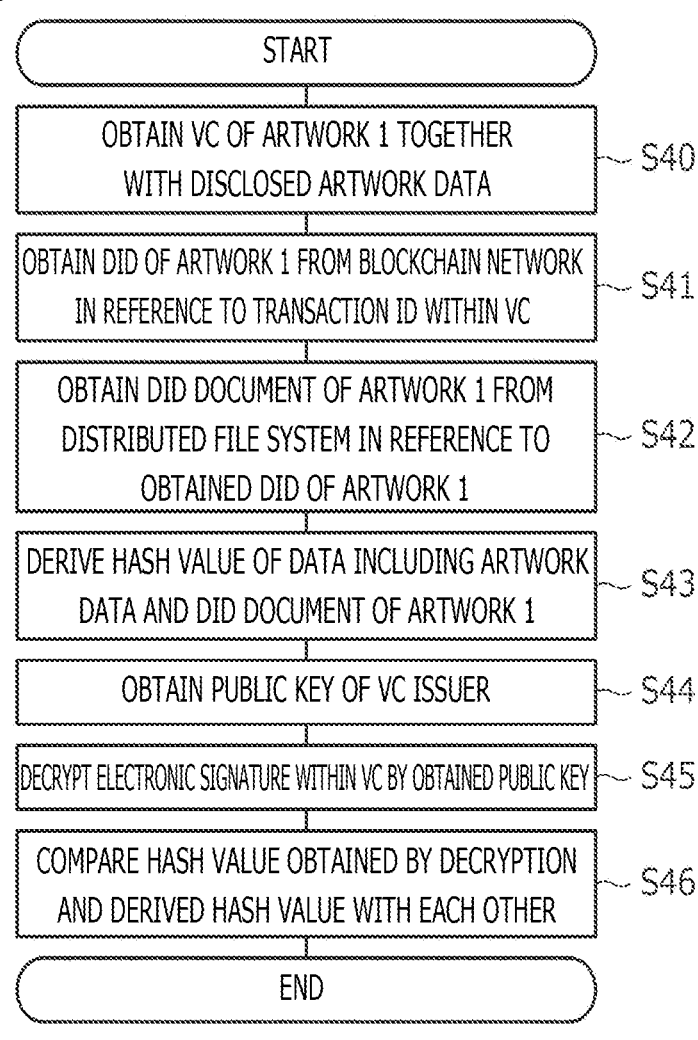

START

OBTAIN VC OF ARTWORK 1 TOGETHER
WITH DISCLOSED ARTWORK DATA    ～ S40

OBTAIN DID OF ARTWORK 1 FROM BLOCKCHAIN NETWORK
IN REFERENCE TO TRANSACTION ID WITHIN VC    ～ S41

OBTAIN DID DOCUMENT OF ARTWORK 1 FROM
DISTRIBUTED FILE SYSTEM IN REFERENCE TO
OBTAINED DID OF ARTWORK 1    ～ S42

DERIVE HASH VALUE OF DATA INCLUDING ARTWORK
DATA AND DID DOCUMENT OF ARTWORK 1    ～ S43

OBTAIN PUBLIC KEY OF VC ISSUER    ～ S44

DECRYPT ELECTRONIC SIGNATURE WITHIN VC BY OBTAINED PUBLIC KEY    ～ S45

COMPARE HASH VALUE OBTAINED BY DECRYPTION
AND DERIVED HASH VALUE WITH EACH OTHER    ～ S46

END

F I G . 1 5
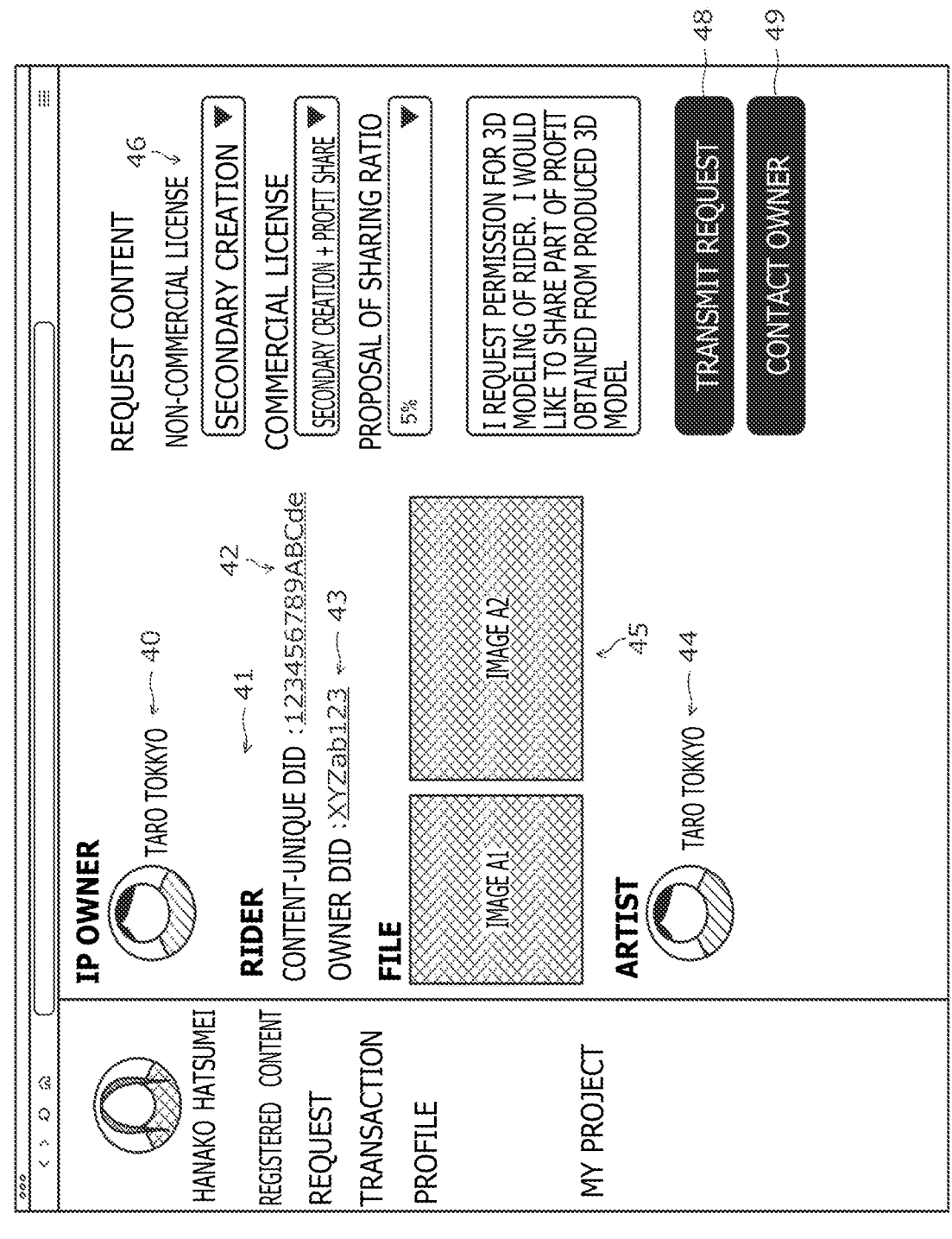

TARO TOKKYO

REGISTERED CONTENT

REQUEST

TRANSACTION

PROFILE

MY PROJECT

16

REQUEST

FROM ME

| DATE | STATUS | TARGET | OWNER | REQUEST ID |
|------|--------|--------|-------|------------|

TO ME

| DATE | STATUS | TARGET | REQUESTOR | REQUEST ID |
|------|--------|--------|-----------|------------|
| 2020/03/31 | PENDING | RIDER | HANAKO HATSUMEI | #123456 |

Figure 1:
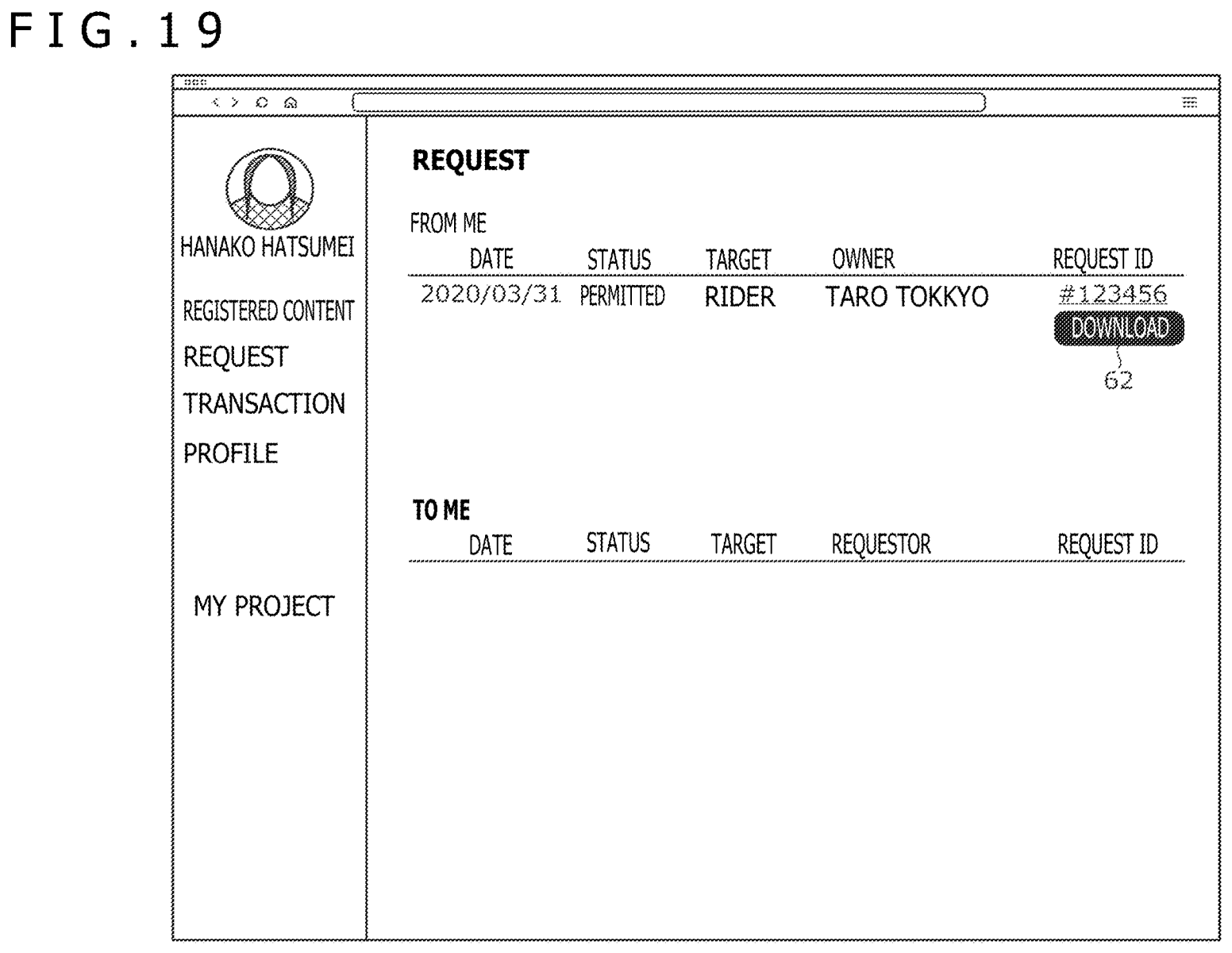

F I G . 1 9

HANAKO HATSUMEI

REGISTERED CONTENT

REQUEST

TRANSACTION

PROFILE

MY PROJECT

REQUEST

FROM ME

| DATE | STATUS | TARGET | OWNER | REQUEST ID |
|------|--------|--------|-------|------------|
| 2020/03/31 | PERMITTED | RIDER | TARO TOKKYO | #123456 |

DOWNLOAD

62

TO ME

| DATE | STATUS | TARGET | REQUESTOR | REQUEST ID |
|------|--------|--------|-----------|------------|

FIG. 20

F I G . 2 1
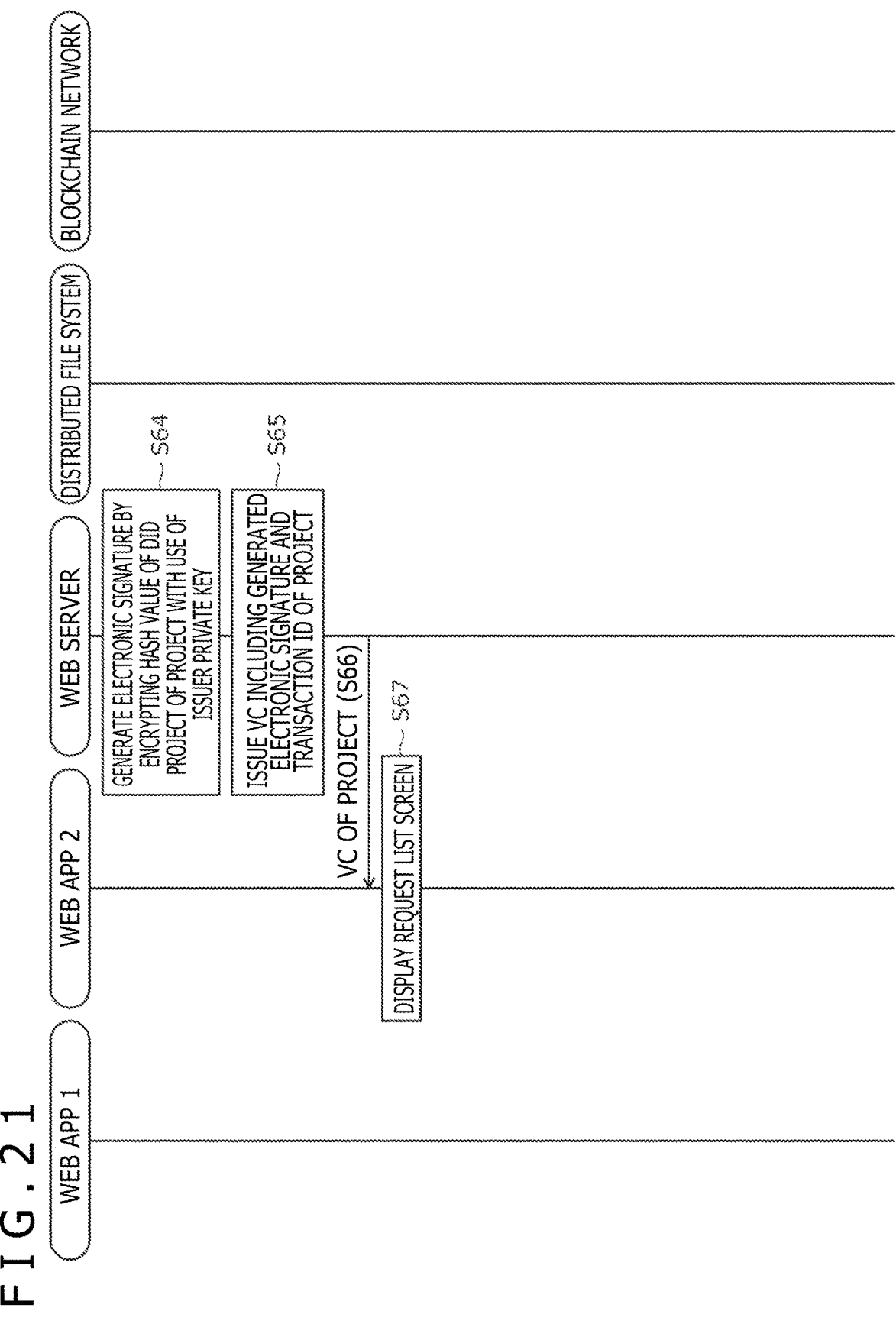

F I G . 2 2 A

```
OWNER          : DID OF ARTIST 2
SIGNATURE      : HASH VALUE OF FSS OF ARTIST 2
TARGET WORK    : DID OF ARTWORK 1
USAGE CONDITION: AGREED CONTENT
```

F I G . 2 2 B

```
ISSUANCE DATE            : 0000/00/00
ISSUER                   : INFORMATION FOR IDENTIFYING WEB SERVER
ELECTRONIC SIGNATURE OF ISSUER : ELECTRONIC SIGNATURE OBTAINED BY ENCRYPTING HASH VALUE
                                 OF DID DOCUMENT OF PROJECT BY PRIVATE KEY OF ISSUER
TRANSACTION ID           : TRANSACTION ID OF PROJECT
```

F I G . 2 3

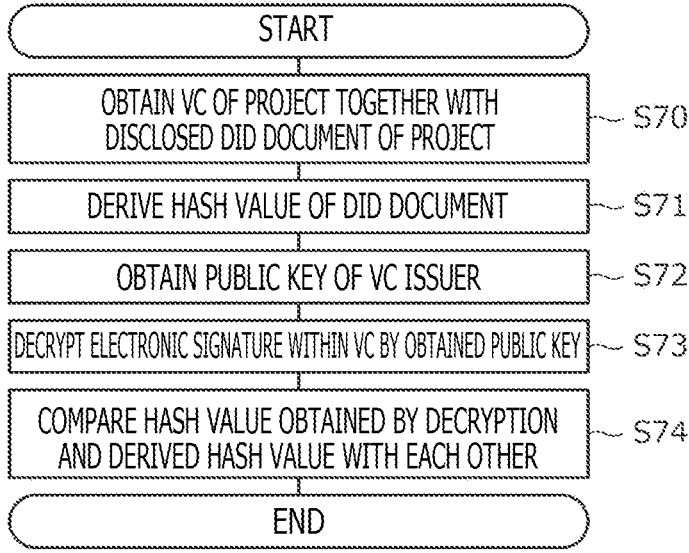

F I G . 2 4
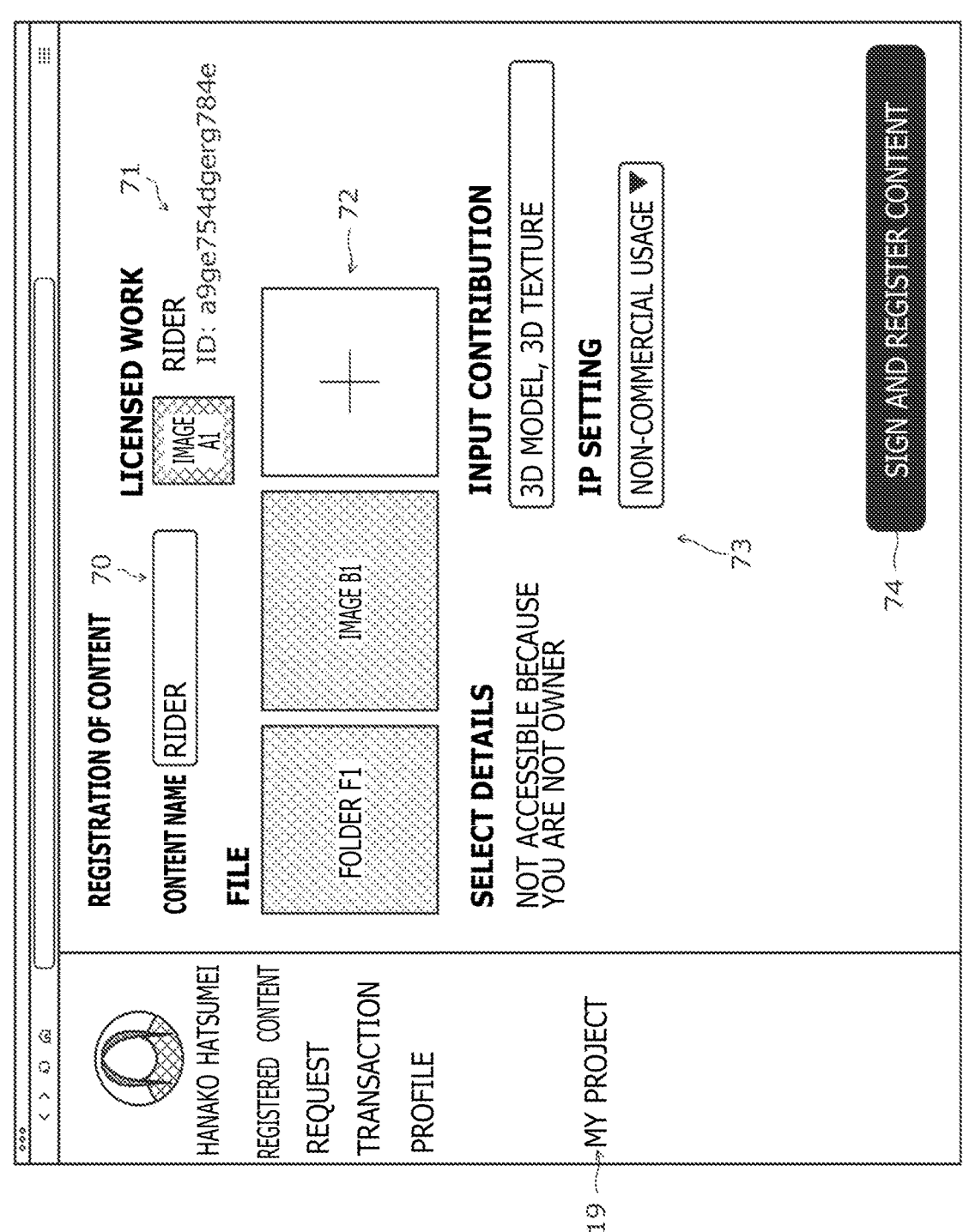

FIG.25

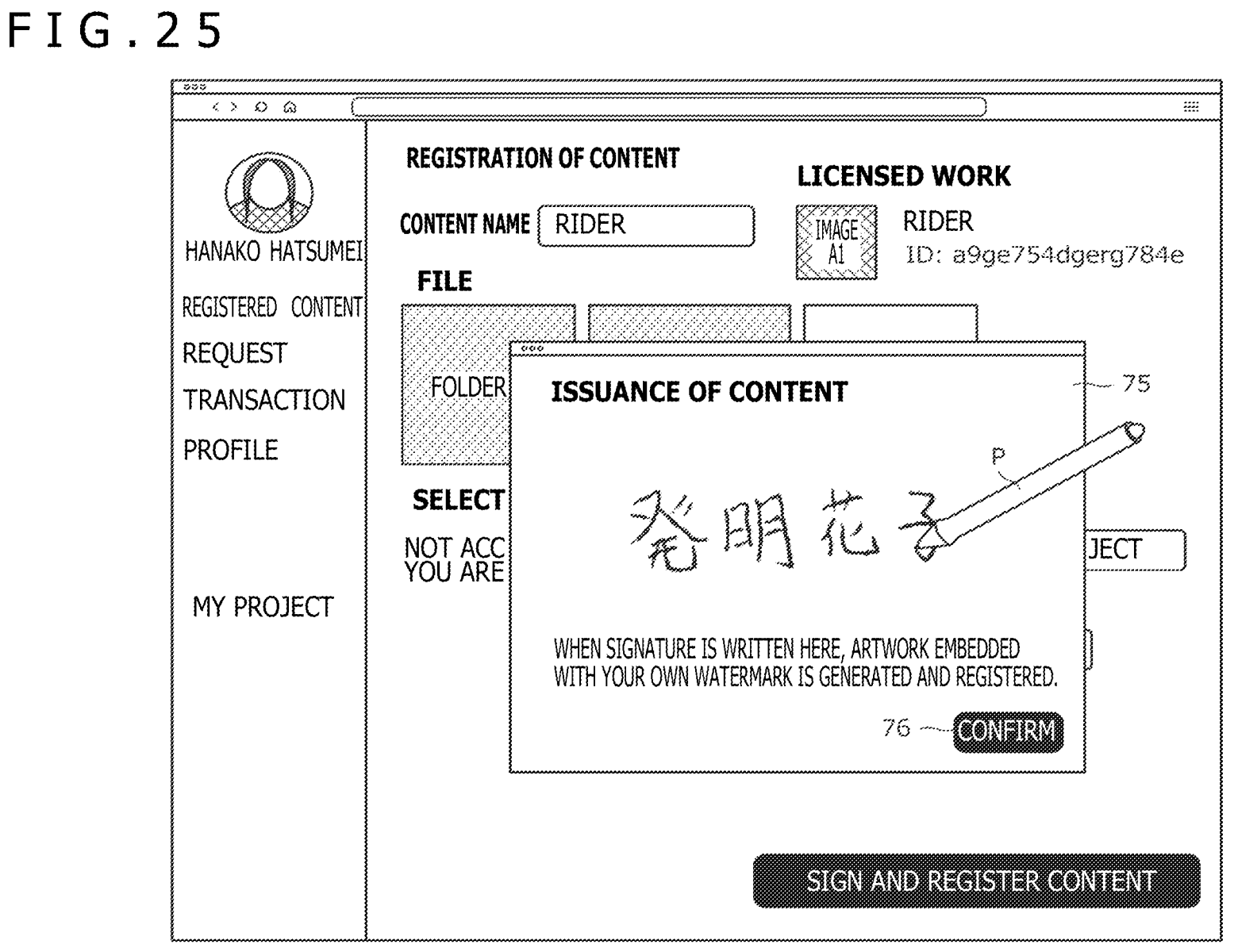

HANAKO HATSUMEI

REGISTERED CONTENT

REQUEST

TRANSACTION

PROFILE

MY PROJECT

REGISTRATION OF CONTENT

LICENSED WORK

CONTENT NAME [ RIDER ]

RIDER

FILE

IMAGE A1

ID: a9ge754dgerg784e

FOLDER

SELECT

NOT ACC
YOU ARE

JECT

ISSUANCE OF CONTENT

発明花子

~75

P

WHEN SIGNATURE IS WRITTEN HERE, ARTWORK EMBEDDED
WITH YOUR OWN WATERMARK IS GENERATED AND REGISTERED.

76 — (CONFIRM)

SIGN AND REGISTER CONTENT

F I G . 2 6

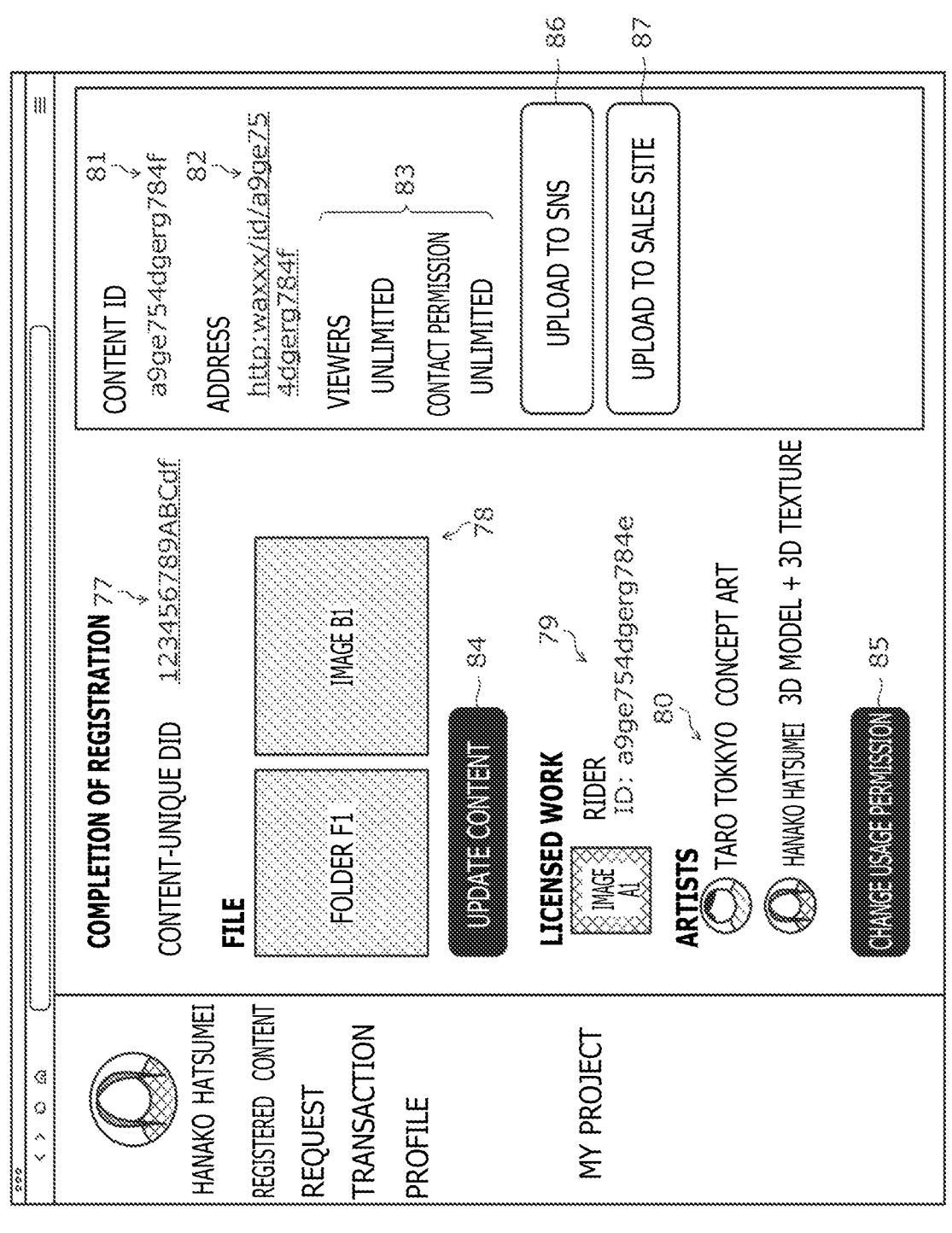

HANAKO HATSUMEI

REGISTERED CONTENT
REQUEST
TRANSACTION
PROFILE

MY PROJECT

COMPLETION OF REGISTRATION 77

CONTENT-UNIQUE DID    1234567789ABCdf

FILE

| FOLDER F1 | IMAGE B1 |

78

UPDATE CONTENT 84

LICENSED WORK

RIDER 79
ID: a9ge754dgerg784e 80

IMAGE A1

ARTISTS

TARO TOKKYO   CONCEPT ART

HANAKO HATSUMEI   3D MODEL + 3D TEXTURE

CHANGE USAGE PERMISSION 85

CONTENT ID 81
a9ge754dgerg784f

ADDRESS 82
http:waxxx/id/a9ge75
4dgerg784f

VIEWERS 83
UNLIMITED

CONTACT PERMISSION
UNLIMITED

UPLOAD TO SNS 86

UPLOAD TO SALES SITE 87

F I G . 2 7
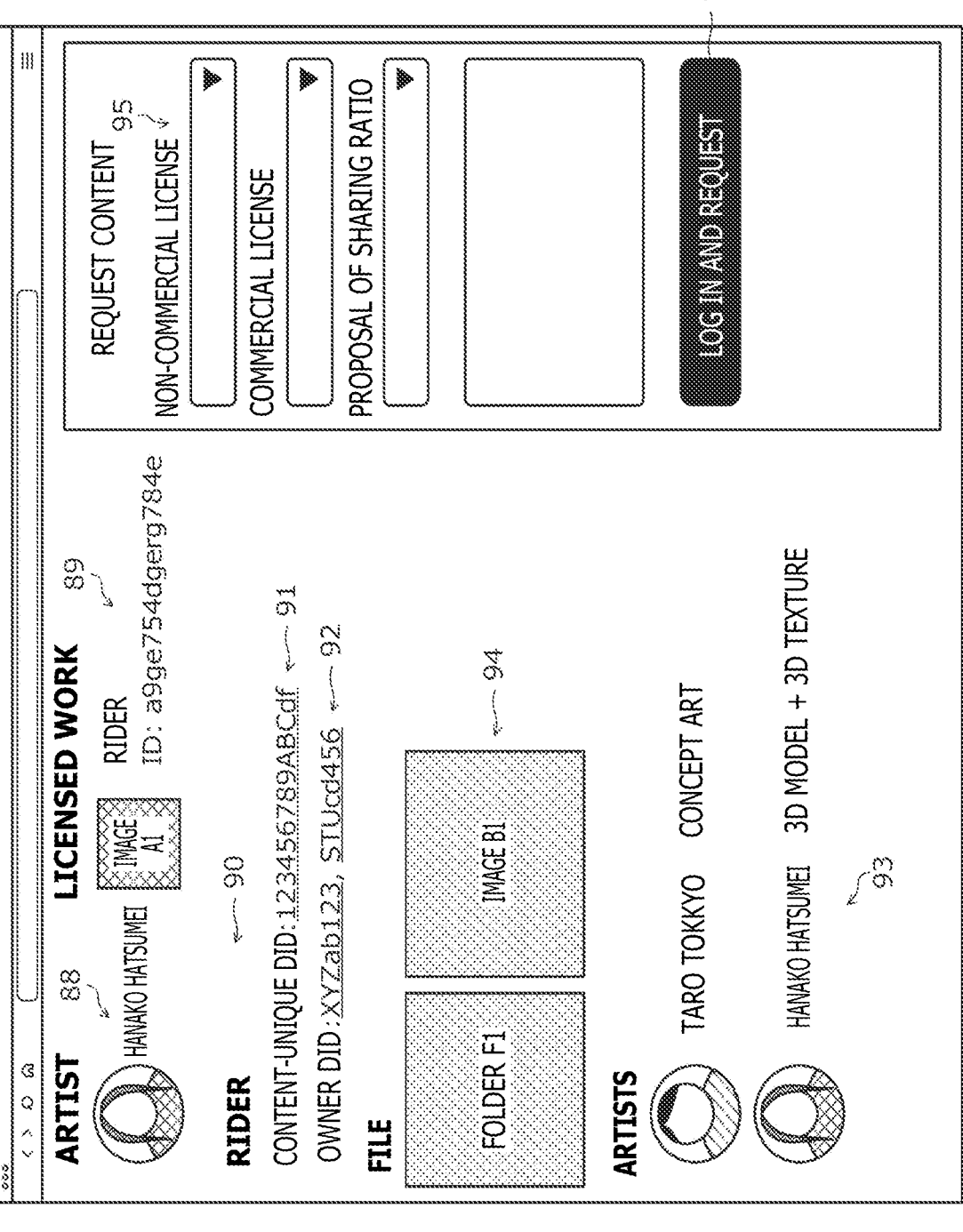

F I G . 2 8
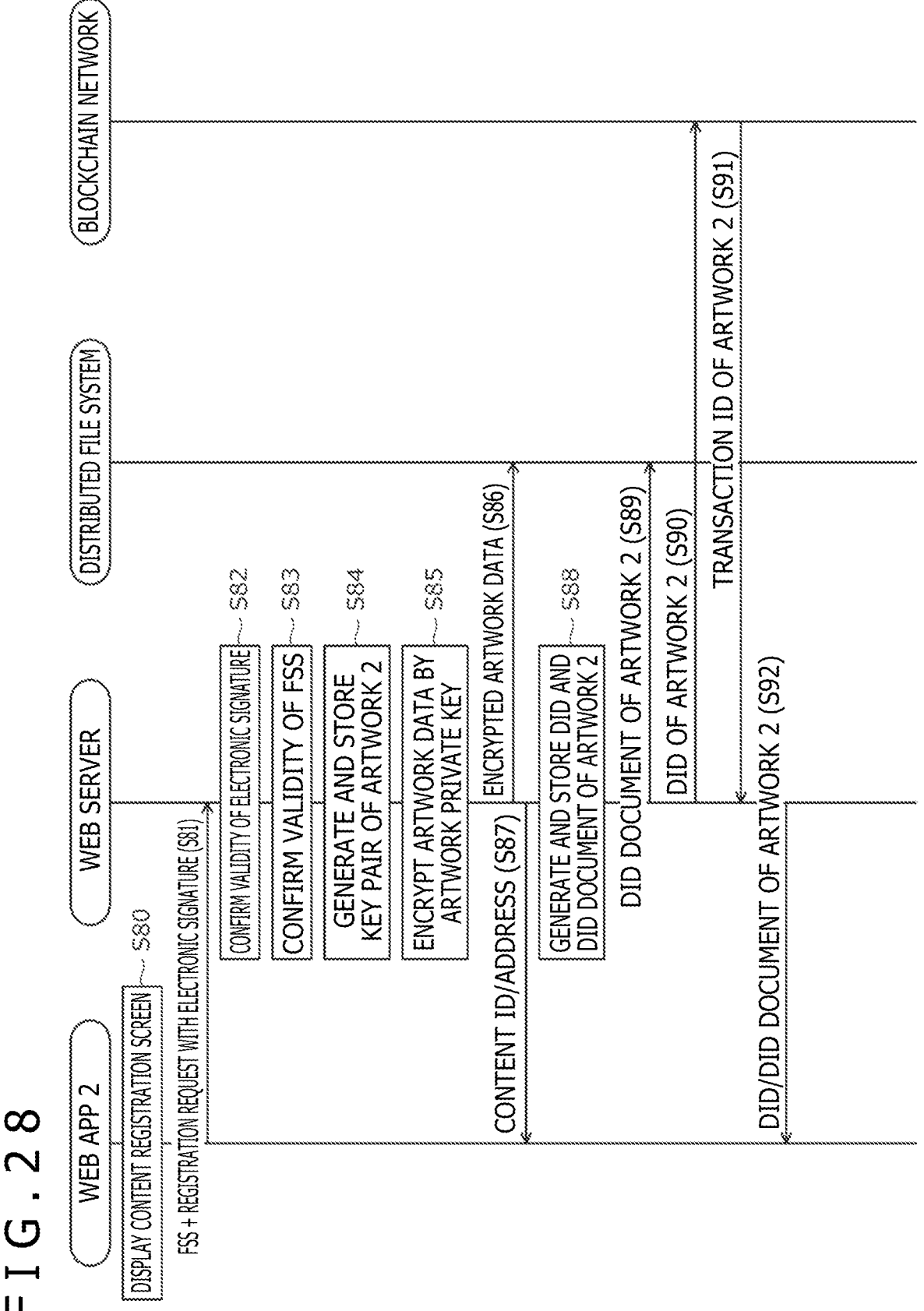

F I G . 2 9
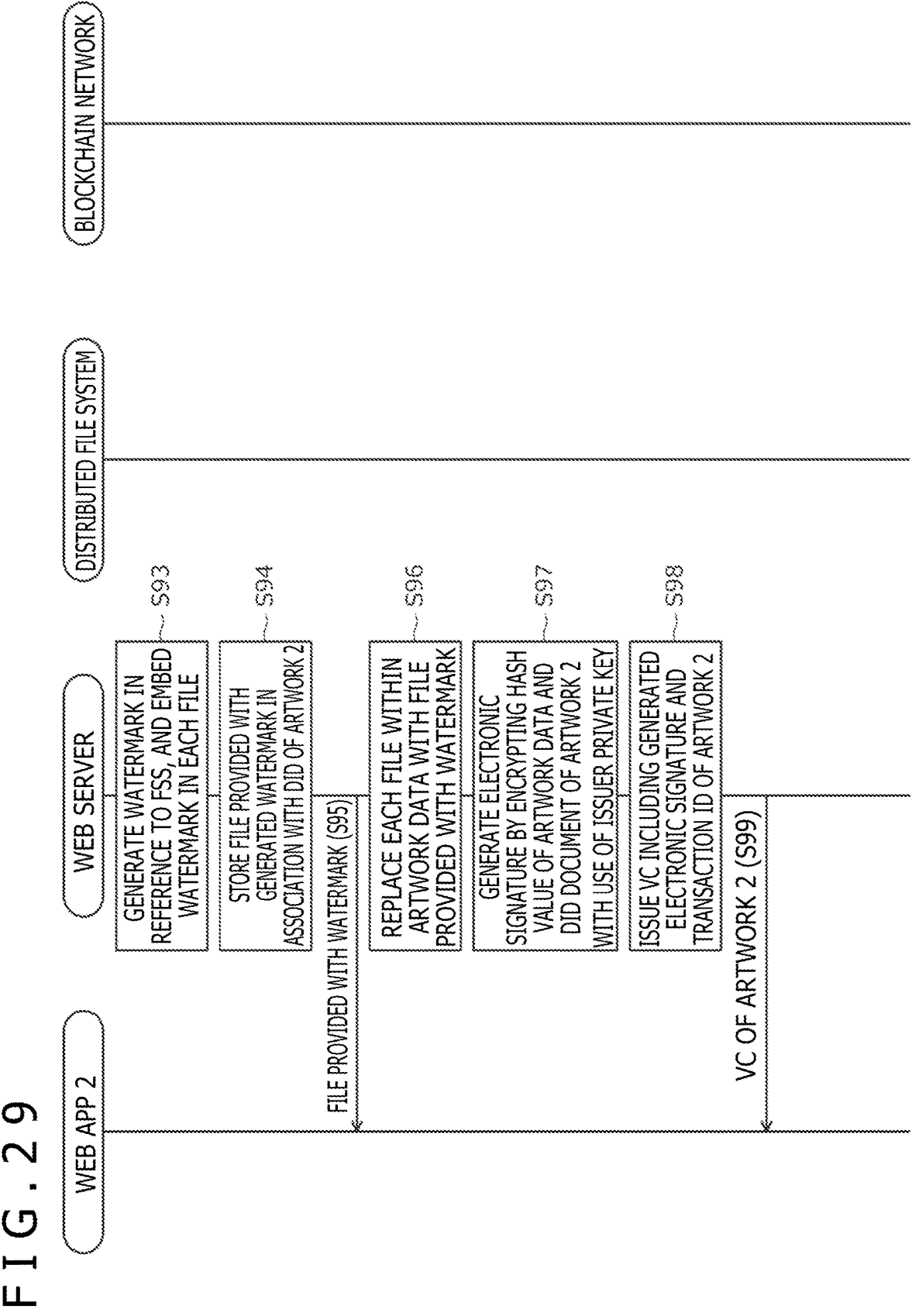

F I G . 3 0
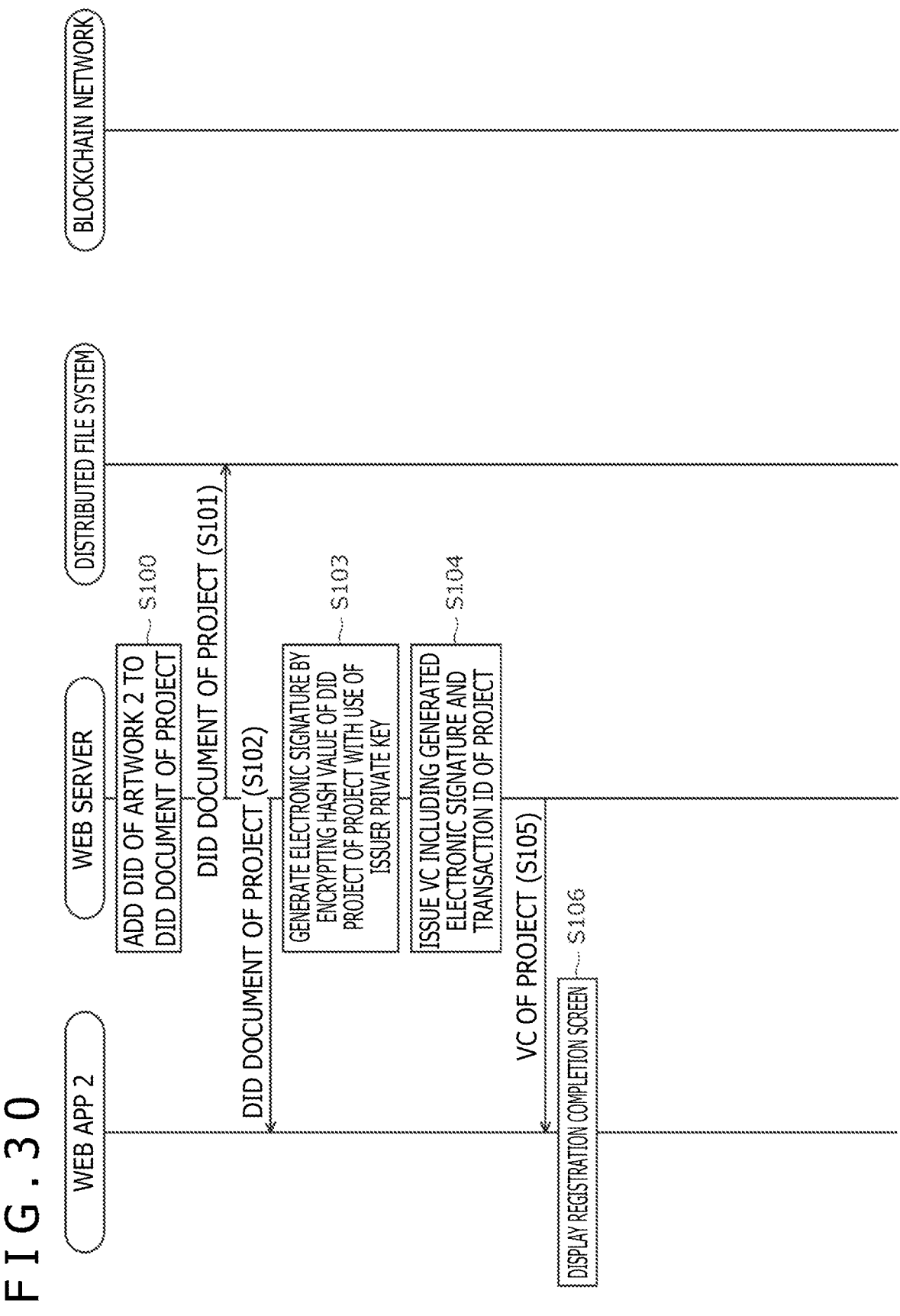

F I G . 3 1 A

```
OWNER INFORMATION : (50%) DID OF ARTIST 1
                     (50%) DID OF ARTIST 2
CONTRIBUTORS      : (CONCEPT ARTIST) DID OF ARTIST 1
                     (3D MODEL + 3D TEXTURE) DID OF ARTIST 2
SECONDARY CREATION : PERMITTED
IP SHARE          : ENDED
USAGE MODE        : COMMERCIALLY USEABLE
SIGNATURE         : HASH VALUE OF FSS OF ARTIST 2
STORAGE LOCATION  : ADDRESS WITHIN DISTRIBUTED FILE SYSTEM
PUBLIC KEY        : PUBLIC KEY OF ARTWORK 2
```

F I G . 3 1 B

```
ISSUANCE DATE              : 0000/00/00
ISSUER                     : INFORMATION FOR IDENTIFYING WEB SERVER
ELECTRONIC SIGNATURE OF ISSUER : ELECTRONIC SIGNATURE OBTAINED BY ENCRYPTING HASH VALUE OF
                             DATA INLCUDING ARTWORK DATA AND DID DOCUMENT OF ARTWORK
                             2 BY PRIVATE KEY OF ISSUER
TRANSACTION ID             : TRANSACTION ID OF ARTWORK 2
```

F I G . 3 1 C

```
OWNER INFORMATION : DID OF ARTIST 2
SIGNATURE         : HASH VALUE OF FSS OF ARTIST 2
TARGET WORK       : DID OF ARTWORK 1
DERIVED WORK      : DID OF ARTWORK 2
USAGE CONDITION   : AGREED CONTENT
```

ARTWORK MANAGING METHOD, COMPUTER, AND PROGRAM

TECHNICAL FIELD

The present disclosure relates to an artwork managing method, a computer, and a program.

BACKGROUND

In recent years, self-sovereign identity (Self-Sovereign Identity; hereinafter referred to as "SSI") is drawing attention. SSI is a mechanism that solves various problems caused by centralized identity (ID) management, by enabling each entity to retain and control its identity (Identity; hereinafter referred to as an "ID") without the intervention of a management entity. In SSI, information is identified by decentralized identity (Decentralized Identity; hereinafter referred to as a "DID") which is an ID of a decentralized type managed by a blockchain. The information identified by the DID is referred to as a DID document, which is stored in a distributed file system such as an interplanetary file system (Interplanetary File System; hereinafter referred to as an "IPFS"). Non-Patent Document 1 describes the standards of the DID and the DID document.

In SSI, certificates referred to as verifiable credentials (Verifiable Credentials; hereinafter referred to as "VCs") are used. A VC represents information including an electronic signature generated by encrypting a hash value of information, which is a verification target, with a private key of an issuer. A person who receives the VC together with the information as the verification target confirms the authenticity of the received information by deriving the hash value of the received information, decrypting the electronic signature with a public key of the issuer, and comparing the derived hash value against the decrypted electronic signature. Non-Patent Document 2 describes the standards of the VC.

PRIOR ART

Patent Documents

Non-Patent Document 1: World Wide Web Consortium, "Decentralized Identifiers (DIDs) v1.0," [online], [retrieved on Mar. 26, 2021], the Internet, <URL: "https://www.w3.org/TR/did-corer">
Non-Patent Document 2: World Wide Web Consortium, "Verifiable Credentials Data Model 1.0," [online], [retrieved on Mar. 26, 2021], the Internet, <URL: "https://www.w3.org/TR/vc-data-model/">

SUMMARY OF INVENTION

Technical Problem

However, conventionally, in handling digital images drawn by a stylus or the like (digital images will hereinafter be referred to as "artwork"), it is difficult to appropriately manage the artwork by SSI.

Hence, it is an object of the present disclosure to provide an artwork managing method, a computer, and a program that can appropriately manage artwork by SSI.

Technical Solution

An artwork managing method according to the present disclosure is an artwork managing method performed by a computer, the artwork managing method including, by the computer, receiving a request for usage of first artwork, and generating a first DID document as a DID document including a first DID, which is a DID for identifying the first artwork, and a second DID, which is a DID for identifying a first user requesting the usage of the first artwork.

A computer according to the present disclosure is a computer configured to receive a request for usage of first artwork, and generate a first DID document as a DID document including a first DID, which is a DID for identifying the first artwork, and a second DID, which is a DID for identifying a first user requesting the usage of the first artwork.

A program according to the present disclosure is a program for causing a computer to perform processing including receiving a request for usage of first artwork; and generating a first DID document as a DID document including a first DID, which is a DID for identifying the first artwork, and a second DID, which is a DID for identifying a first user requesting the usage of the first artwork.

Advantageous Effect

According to the present disclosure, artwork can appropriately be managed by SSI.

BRIEF DESCRIPTION OF DRAWINGS

FIG. 1 is a diagram illustrating a configuration of an artwork management system 1 according to a present embodiment.

FIG. 2 is a diagram illustrating an example of a hardware configuration of artist terminals 3 and a Web server 4.

FIG. 3 is a diagram illustrating a configuration of biometric signature data.

FIG. 4 is a diagram illustrating a sample screen of a Web app 3*a* displayed on the display of an artist terminal 3, on which registration of artwork 1 is performed.

FIG. 7 is a diagram illustrating a sample screen of the Web app 3*a* displayed on the display of the artist terminal 3, on which registration of the artwork 1 is performed.

FIG. 8 is a diagram illustrating a sample screen of the Web app 3*a* displayed on the display of the artist terminal 3, on which registration of the artwork 1 is performed.

FIG. 12A is a diagram illustrating an example configuration of a DID document of the artwork 1, and FIG. 12B is a diagram illustrating content of a VC for the artwork 1.

FIG. 13 is a flowchart illustrating a flow of processing performed by a computer that receives artwork data and the VC of the artwork 1 via an SNS (Social Networking Service) or a sales site.

FIG. 15 is a diagram illustrating a sample screen of the Web app 3*a* displayed on the display of the artist terminal 3, on which the usage request for the artwork 1 is made.

FIG. 16 is a diagram illustrating a sample screen of the Web app 3*a* displayed on the display of the artist terminal 3, which has received the usage request for the artwork 1.

FIG. 17 is a diagram illustrating a sample screen of the Web app 3*a* displayed on the display of the artist terminal 3, which has received the usage request for the artwork 1.

FIG. 19 is a diagram illustrating a sample request list screen, displayed by the Web app 3*a* of an artist 2 who has made the request, as a result of processing performed by the Web server 4.

FIG. 20 is a sequence diagram illustrating processing related to the usage request for the artwork 1.

FIG. 21 is a sequence diagram illustrating processing related to the usage request for the artwork 1.

FIG. 22A is a diagram illustrating an example configuration of a DID document of a project, and FIG. 22B is a diagram illustrating content of a VC for the project.

FIG. 23 is a flowchart illustrating a flow of processing performed by a computer that receives the DID document and the VC of the project via the SNS or the sales site.

FIG. 24 is a diagram illustrating a sample screen of the Web app 3*a* displayed on the display of the artist terminal 3, on which registration of artwork 2 is performed.

FIG. 25 is a diagram illustrating a sample screen of the Web app 3*a* displayed on the display of the artist terminal 3, on which registration of the artwork 2 is performed.

FIG. 26 is a diagram illustrating a sample screen of the Web app 3*a* displayed on the display of the artist terminal 3, on which registration of the artwork 2 is performed.

FIG. 27 is an artwork detail screen that is displayed when a user selects the artwork 2 on an artwork list display screen.

FIG. 28 is a sequence diagram illustrating processing related to the registration of the artwork 2.

FIG. 29 is a sequence diagram illustrating processing related to the registration of the artwork 2.

FIG. 30 is a sequence diagram illustrating processing related to the registration of the artwork 2.

FIG. 31A is a diagram illustrating an example configuration of a DID document of the artwork 2, FIG. 31B is a diagram illustrating content of a VC for the artwork 2, and FIG. 31C is a diagram illustrating the DID document of the project as updated.

DETAILED DESCRIPTION

Figure 5:
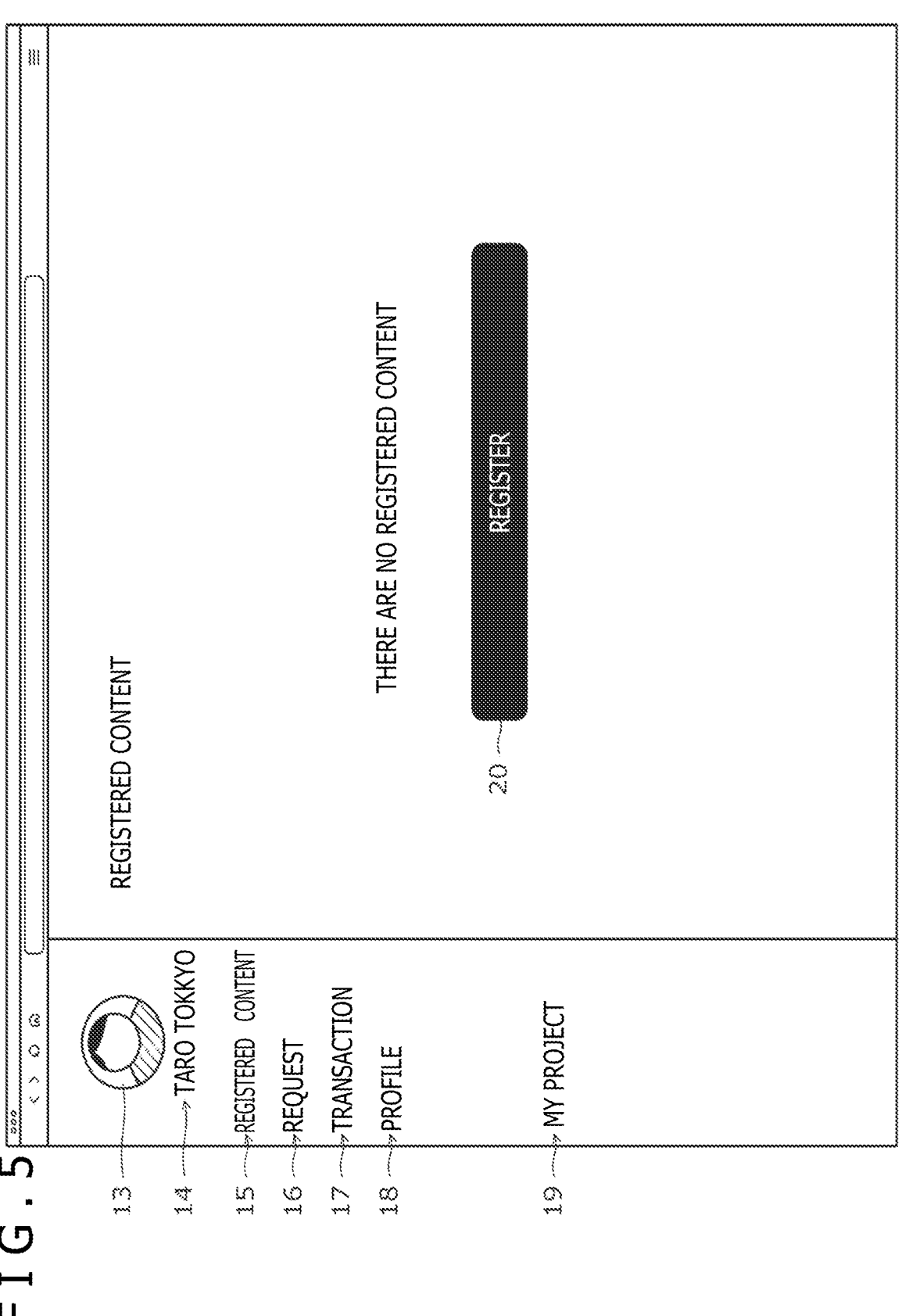
FIG. 5 is a diagram illustrating a sample screen of the Web app 3*a* displayed on the display of the artist terminal 3, on which registration of the artwork 1 is performed.

An embodiment of the present disclosure will hereinafter be described in detail with reference to the accompanying drawings.

FIG. 1 is a diagram illustrating a configuration of an artwork management system 1 according to the present embodiment. As illustrated in the figure, the artwork management system 1 has a configuration in which a plurality of artist terminals 3, a Web server 4, a distributed file system 5, and a blockchain network 6 are interconnected via a network 2.

FIG. 2 is a diagram illustrating an example of a hardware configuration of the artist terminals 3 and the Web server 4. Each of the artist terminals 3 and the Web server 4 can be constituted by a computer 100 having a configuration illustrated in the figure. The Web server 4 may be formed by a plurality of computers 100 being coupled to each other.

As illustrated in FIG. 2, the computer 100 includes a CPU (Central Processing Unit) 101, a storage device 102, an input device 103, an output device 104, and a communicating device 105.

The CPU 101 is a device that controls various parts of the computer 100, and reads and executes various kinds of programs stored in the storage device 102. Each piece of processing to be described with reference to the following FIGS. 3 to 31 is implemented by the CPU 101 of an artist terminal 3 or the Web server 4 executing a program stored in the storage device 102. The programs executed by the CPU 101 of the artist terminal 3 include a Web app 3*a* illustrated in FIG. 1.

The storage device 102 includes a main storage device such as a DRAM (Dynamic Random Access Memory) and an auxiliary storage device such as a hard disk. The storage device 102 plays a role of storing an operating system of the computer 100, various kinds of programs for executing various kinds of applications, and data used by these programs.

The input device 103 is a device that receives an input operation performed by a user, and supplies the input operation to the CPU 101. The input device 103 includes, for example, a keyboard, a mouse, and a touch detecting device. Of these, the touch detecting device is a device including a touch sensor and a touch controller, and is used to detect a pen input or a touch input. A pen P illustrated in FIG. 1 is an electronic pen used to perform a pen input to the touch detecting device of the artist terminal 3. The pen input by the pen P is realized by, for example, an active capacitance system or an electromagnetic induction system.

The output device 104 is a device that outputs a processing result of the CPU 101 for the user. The output device 104 includes a display and a speaker, for example. The communicating device 105 is a device for communicating with an external device. The communicating device 105 transmits and receives data according to instructions of the CPU 101. By using the communicating device 105, each of the artist terminals 3 and the Web server 4 communicates with another device, a system, a network, and the like including the distributed file system 5 and the blockchain network 6 illustrated in the figure.

The description returns to FIG. 1. Each of the plurality of artist terminals 3 is a computer used to perform production of artwork, registration of the produced artwork with the Web server 4, issuance of a usage request for artwork produced by another artist, input of biometric signature data to be described later, and the like. Any computer such as a personal computer, a tablet terminal, or a smart phone can be used as specific hardware of the artist terminal 3. The artwork and the biometric signature data are each digital data. The artwork and the biometric signature data include digital ink data (to be described later) generated by an artist performing pen input to the input device 103 of the artist terminal 3 with use of the pen P.

FIG. 3 is a diagram illustrating a configuration of the biometric signature data. The biometric signature data is data generated according to WILL (Wacom Ink Layer Language) or FSS (Forensic Signature Stream), for example. As illustrated in the figure, the biometric signature data includes dynamic signature data, a hash value of a signed document, context information, additional information, a hash value of the dynamic signature data; the hash value of the signed document; and the context information, and a hash value of this hash value and the additional information, as well as a checksum for detecting an error that can occur at times of transmission and reception of this hash value.

The dynamic signature data is digital ink data including a series of pieces of coordinate data constituting a line drawing. Each piece of coordinate data is data indicating the position of the pen P detected by the touch detecting device described above. More specifically, the touch sensor includes a plurality of X-electrodes each extending in a Y-direction and arranged at equal intervals in an X-direction and a plurality of Y-electrodes each extending in the X-direction and arranged at equal intervals in the Y-direction. In a case where the pen P is capable of transmitting signals, the touch controller receives burst signals transmitted from the pen P at the plurality of X-electrodes and the plurality of Y-electrodes, to thereby obtain coordinate data indicating the position of the pen P. In a case where the pen P is not capable of transmitting signals, on the other hand, the touch controller transmits signals sequentially to the plurality of X-electrodes and receives the signals at the plurality of Y-electrodes to detect a change in amplitude of the received signals, to thereby obtain coordinate data indicating the position of the pen P. The touch controller is configured to collect coordinate data at a frequency of 100 times or 200 times per second, for example.

The hash value of the signed document is a hash value of electronic data of a document (an exhibition request, a contract, or the like), which is signed by the artist to generate biometric signature data. The hash value is a value obtained by inputting the target electronic data to a predetermined one-way hash function. The same is true for the other hash values to be described later.

The context information is information including the name data of the artist who signed, a signature date and time, a purpose of the signature, information regarding the touch detecting device used for the signature (a manufacturer name, a model name, and the like), information regarding an application used for the signature (an application name, version information, and the like), information regarding the operating system of the artist terminal 3 (an operating system name, version information, and the like), address information of the artist terminal 3 (an IP (Internet Protocol) address, a MAC (Media Access Control) address, and the like), and the like. The additional information is information that can optionally be specified by an administrator of the artwork management system 1, other than the dynamic signature data, the hash value of the signed document, and the context information.

The description returns to FIG. 1. The Web server 4 is a server that performs various kinds of processing for implementing the management of artwork. The various kinds of processing include processing to register artwork and its associated data with the distributed file system 5 or the blockchain network 6 and processing to receive a usage request for the artwork. Details of each processing will be described later. In a case where the Web server 4 is formed of a plurality of computers 100 coupled to each other, the various kinds of processing to be described later can be distributed to and performed by the plurality of computers 100.

The distributed file system 5 is a network of a plurality of computers connected on a peer-to-peer basis. The distributed file system 5 is configured to store any electronic data. A specific distributed file system 5 may be the interplanetary file system described above, or may be a distributed file system of another kind. In one example, electronic data stored in the distributed file system 5 is identified by a hash value thereof. That is, in the distributed file system 5, the hash value of the stored electronic data functions as address information of the electronic data. In the present embodiment, the distributed file system 5 is used to store encrypted artwork and various kinds of DID documents. As will also be described in subsequent description, in a case where artwork is managed by SSI, a DID is given to each piece of artwork stored in the distributed file system 5, and in a DID document thereof, the following is arranged including owner information indicating an owner of the artwork, address information indicating a placement location of the actual item of the artwork, and license information (whether or not secondary creation is possible, whether or not commercial usage is possible, and so forth).

The blockchain network 6 is a network of a plurality of computers connected on a peer-to-peer basis. The blockchain network 6 is configured to record a smart contract transaction in a blockchain. To cite a specific example, the blockchain network 6 is an Ethereum network. The recording of the transaction in the blockchain is performed by several computers connected to the blockchain network 6 (the computers will hereinafter be referred to as "miners").

Specifically, each block constituting the blockchain includes a block header and data (transaction data) indicating specific content of the transaction. Of these, the block header includes a Merkle root as data formed by compressing the size of the transaction data, a hash value of an immediately preceding block, and a nonce value as an arbitrary character string. The blockchain network 6 stipulates a rule that, in order to connect a new block to the blockchain, a hash value of the block must satisfy a predetermined condition (for example a condition that the hash value be a value starting with "000"). Accordingly, the miners that intend to record a certain block in the blockchain perform work (mining) of trying to find a nonce value in a round-robin manner such that a hash value of the block header of the block satisfies the predetermined condition. A miner who first succeeds in finding the nonce value, ahead of other miners, connects the block to the blockchain. The recording of the transaction to the blockchain is thereby completed.

In the following, various kinds of processing performed by the Web server 4 will be described specifically. In the following, first, processing related to the registration of artwork produced without being based on other artwork (the produced artwork will hereinafter be referred to as "artwork 1," and an artist who produced the artwork 1 will be referred to as an "artist 1" or "Taro Tokkyo") will be described with reference to FIGS. 4 to 13. Next, processing related to a usage request for the artwork 1 will be described with reference to FIGS. 14 to 23. Finally, processing related to the registration of artwork produced based on the artwork 1 (the produced artwork will hereinafter be referred to as "artwork 2," and an artist who produced the artwork 2 will be referred to as an "artist 2" or "Hanako Hatsumei") will be described with reference to FIGS. 24 to 31.

The processing related to the registration of the artwork 1 will first be described. FIGS. 4 to 8 are sample screens of a Web app 3*a* displayed on the display of an artist terminal 3, on which the registration of the artwork 1 is performed. When the artist 1 as the user of the artist terminal 3 starts up the Web app 3*a*, the Web app 3*a* displays a login screen illustrated in FIG. 4. As illustrated in the figure, the login screen includes an email address input field 10, a password input field 11, and a login button 12. Here, when the artist 1 inputs an email address and a password, which are preregistered with the Web app 3*a*, to the email address input field 10 and to the password input field 11, and selects the login button 12, the Web app 3*a* displays the screen of FIG. 5.

As illustrated in FIG. 5, the screen of the Web app 3*a* which is displayed after a login is configured to includes a side menu on a left side. Arranged in the side menu are a photograph 13 and a name 14 of the logged-in user, a link 15 to a registered content screen, a link 16 to a request list screen, a link 17 to a transaction screen, a link 18 to a profile screen, and a link 19 to a my-project screen. Of these screens, the registered content screen is a screen for managing artwork uploaded by the logged-in user. The request list screen is a screen for managing artwork usage requests (including usage requests made by the logged-in user and usage requests made to the logged-in user). The transaction screen is a screen for managing a transaction ID obtained as a result of recording in the blockchain network 6. The profile screen is a screen for managing information regarding the logged-in user (which is a name, a photograph, an email address, a password, and the like, and will hereinafter be referred to as "user information"). The my-project screen is a screen for managing a project (to be described later) created by the logged-in user.

FIG. 5 illustrates the registered content screen in a case where there is no registered content. As illustrated in the figure, the registered content screen in this case displays a registration button 20. The artist 1 who has completed the production of the artwork 1 and intends to register the artwork 1 with the Web server 4 selects the registration button 20.

Figure 6:
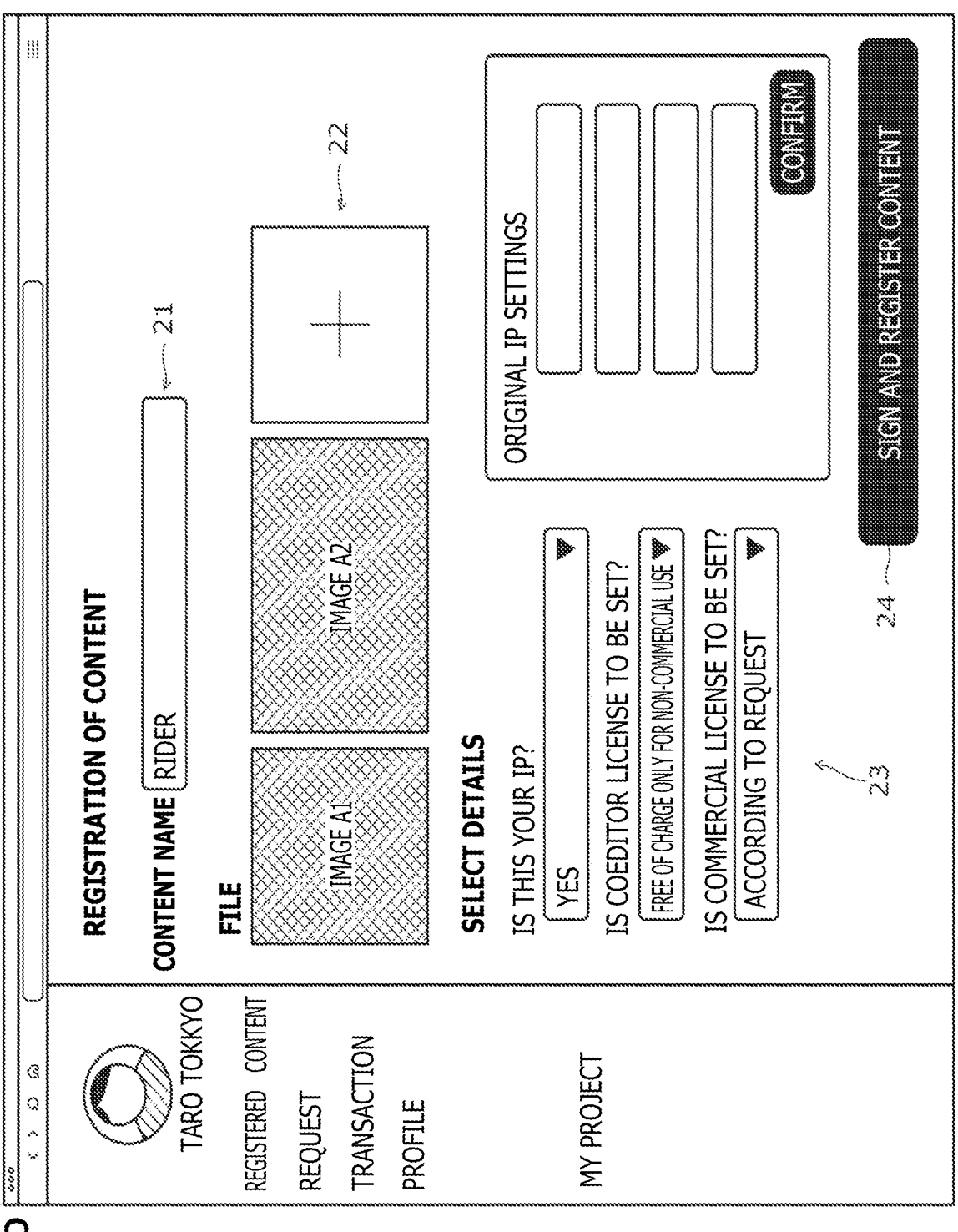
FIG. 6 is a diagram illustrating a sample screen of the Web app 3*a* displayed on the display of the artist terminal 3, on which registration of the artwork 1 is performed.

FIG. 6 represents a content registration screen displayed by the Web app 3*a* that detects the selection of the registration button 20 in FIG. 5. As illustrated in the figure, the content registration screen includes a content name input section 21, a file selection interface 22, an artwork metadata input interface 23, and a registration button 24.

The content name input section 21 is a text box for inputting the name of the artwork 1 freely named by the artist 1. In FIG. 6, "Rider" is input as the name of the artwork 1. The selection interface 22 is an interface for selecting a file(s) of the artwork that the artist 1 intends to register. The file(s) selected here is (are), for example, an image file(s) such as a jpg file(s) or a png file(s). The artwork 1 is constituted by one or more files selected here. As illustrated in FIG. 24 to be described later, the selection interface 22 is configured to allow selection of a folder including a plurality of files. FIG. 6 illustrates a state in which two images A1 and A2 are selected. The image A2 is a picture including a person, for example, and the image A1 is a partly enlarged image of the image A2, for example.

The metadata input interface 23 is an interface for inputting metadata as information for describing the artwork 1. As illustrated in FIG. 6, specific content of the metadata input can include information indicating whether or not the artwork 1 is an intellectual property (Intellectual Property; hereinafter referred to as an "IP") of the artist 1 (that is, whether or not the artist 1 is the owner of the artwork 1) and various kinds of information related to a license of the artwork 1. In the example of FIG. 6, the various kinds of information related to the license include information indicating whether or not to set a coeditor license, information indicating whether or not to set a commercial license, and one or more pieces of information originally conceived and input by the user (original IP setting(s)).

When the user selects the registration button 24, the Web app 3*a* displays a signature window 25 illustrated in FIG. 7. The signature window 25 includes an interface for the artist 1 to input a handwritten signature by using the pen P and a confirmation button 26. When the artist 1 who has input the signature selects the confirmation button 26, the Web app 3*a* generates the biometric signature data illustrated in FIG. 3, on the basis of the input signature, and then transmits a registration request illustrated in FIG. 10 to be described later to the Web server 4. As will be described later in detail, in response to the registration request, the Web server 4 performs processing of registering the artwork 1 with the distributed file system 5, processing of generating a DID and a DID document of the artwork 1 and registering the DID document with the distributed file system 5 while recording the DID in the blockchain network 6, processing of generating a VC for certifying the authenticity of the artwork 1, and processing of embedding a watermark in each file constituting the artwork 1.

FIG. 8 is a registration completion screen displayed by the Web app 3*a* after completion of the series of processing by the Web server 4. As illustrated in the figure, the registration completion screen includes display sections 27 to 31 for displaying predetermined information and operation buttons 32 to 36 for performing predetermined operations.

The display section 27 displays the DID of the artwork 1 which is recorded in the blockchain network 6 by the Web server 4. The display section 28 displays the thumbnails of files constituting the artwork 1, in a list. Clicking the thumbnails, the artist 1 can download the corresponding files. While the files downloaded in this case are preferably watermarked files to be described later, files not provided with watermarks may be downloaded. The display section 29 displays a content ID given when the Web server 4 registers the artwork 1 with the distributed file system 5. The content ID is specifically a hash value of artwork data including each file constituting the artwork 1 and the metadata. The display section 30 displays the address of the artwork 1 in the distributed file system 5. In a typical example, this address is one obtained by adding the content ID to the URL (Uniform Resource Locator) of the distributed file system 5. The display section 31 displays the whole or part of the metadata of the artwork 1.

The operation button 32 is a push button for updating the artwork 1. Detecting selection of the operation button 32, the Web app 3*a* displays a screen for adding, changing, or deleting a file constituting the artwork 1. The operation button 33 is a push button for changing the ownership of the artwork 1. Detecting selection of the operation button 33, the Web app 3*a* displays a screen for designating a new owner of the artwork 1. The operation button 34 is a push button for changing the metadata of the artwork 1. Detecting selection of the operation button 34, the Web app 3*a* displays a screen for changing the metadata of the artwork 1. When corresponding information on the screens displayed according to the selection of the operation buttons 32 to 34 is actually changed, etc., the Web app 3*a* again transmits a registration request to the Web server 4. Consequently, the artwork 1 registered with the distributed file system 5 is changed, a new DID is recorded in the blockchain network 6, a new VC is issued, and a new watermark is embedded in each file constituting the artwork 1.

The operation button 35 is a push button for uploading the artwork 1 to an SNS. In addition, the operation button 36 is a push button for uploading the artwork 1 to a sales site. Detecting selection of the operation button 35 or the operation button 36, the Web app 3*a* displays a screen for selecting an SNS or a sales site as an upload destination of the artwork 1. When the user selects a certain SNS or a certain sales site on this screen, the Web app 3*a* transmits artwork data including each file (in which a watermark is embedded) constituting the artwork 1 and the metadata to the SNS or the sales site together with the VC issued by the Web server 4. It is thus possible to securely disclose information regarding the artwork 1 on the SNS or the sales site.

Figure 9:
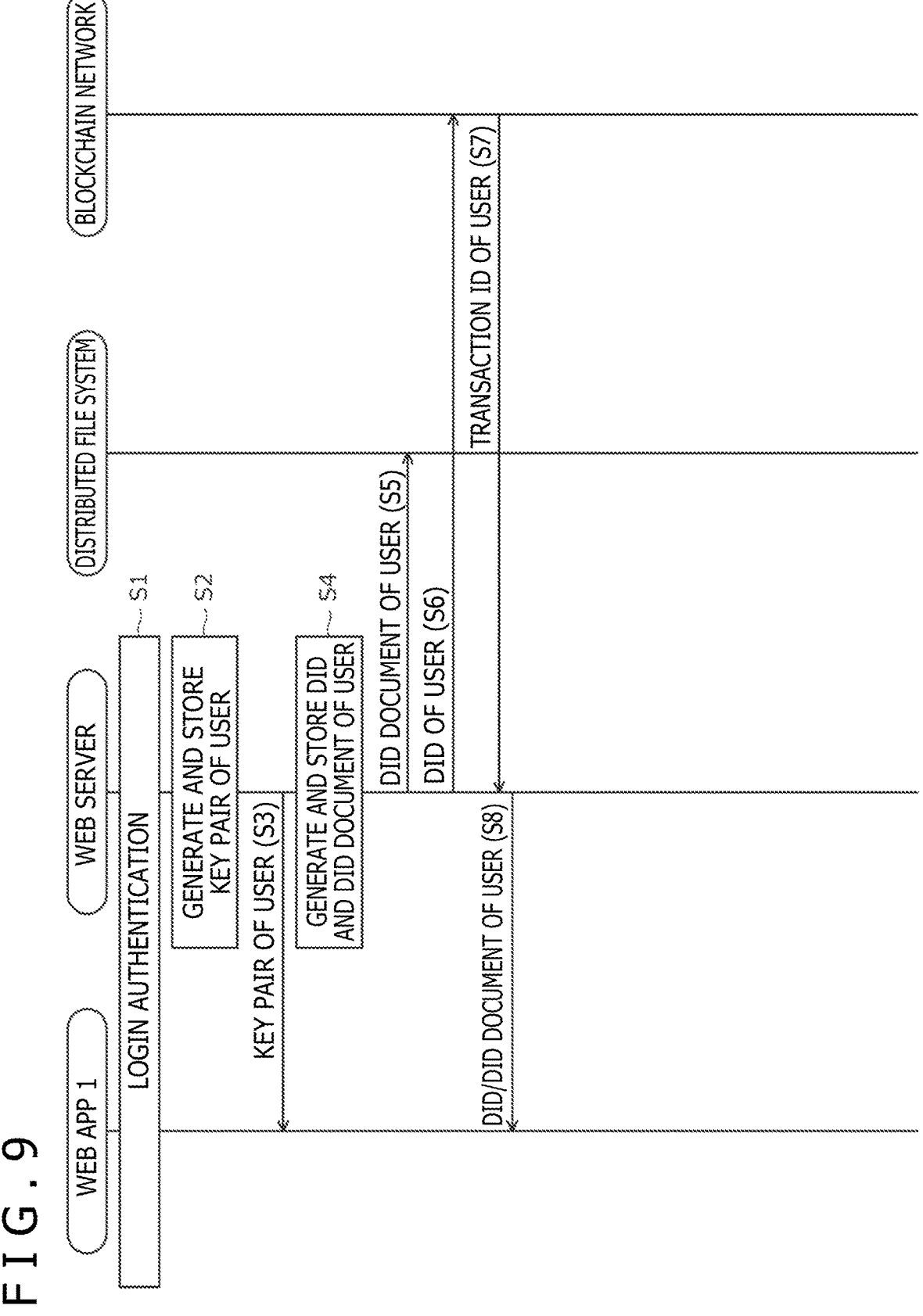
FIG. 9 is a sequence diagram illustrating processing related to the registration of a new user.

Processing performed by the Web app 3*a* and the Web server 4 will next be described in detail. First, FIG. 9 is a sequence diagram illustrating processing related to the registration of a new user. As illustrated in the figure, the Web app 3*a* and the Web server 4 first perform login processing by using the login screen illustrated in FIG. 4 (step S1). In a case where an email address and a password are not yet registered with the Web app 3*a*, processing of registering various kinds of user information including a combination of the email address and the password is also performed in this step S1.

When the login processing is completed, the Web server 4 determines whether or not a key pair (a combination of a public key and a private key according to a public key cryptosystem; the same applies hereinafter) of the user is already generated. When the key pair is not generated yet, the Web server 4 generates and stores a new key pair (step S2). The Web app 3*a* receives the generated key pair from the Web server 4 and stores the key pair (step S3).

In addition, the Web server 4 generates and stores the DID of the user and a DID document including the whole or part of the user information described above (step S4). Then, the Web server 4 registers the generated DID document with the distributed file system 5 (step S5), and issues a smart contract for recording the generated DID in the blockchain to the blockchain network 6 (step S6). When the recording of the DID in the blockchain is completed, the blockchain network 6 issues a transaction ID. The Web server 4 receives this transaction ID (transaction ID of the user) from the blockchain network 6, and stores the transaction ID (step S7). In addition, the Web server 4 transmits the generated DID and the generated DID document of the user also to the Web app 3*a* (step S8). The Web app 3*a* stores the DID and the DID document that it has received. The Web app 3*a* uses the DID of the user at a time of generating a request to register the artwork 1 as described later, and uses the DID document of the user in order to generate the profile screen described above.

Figure 10:
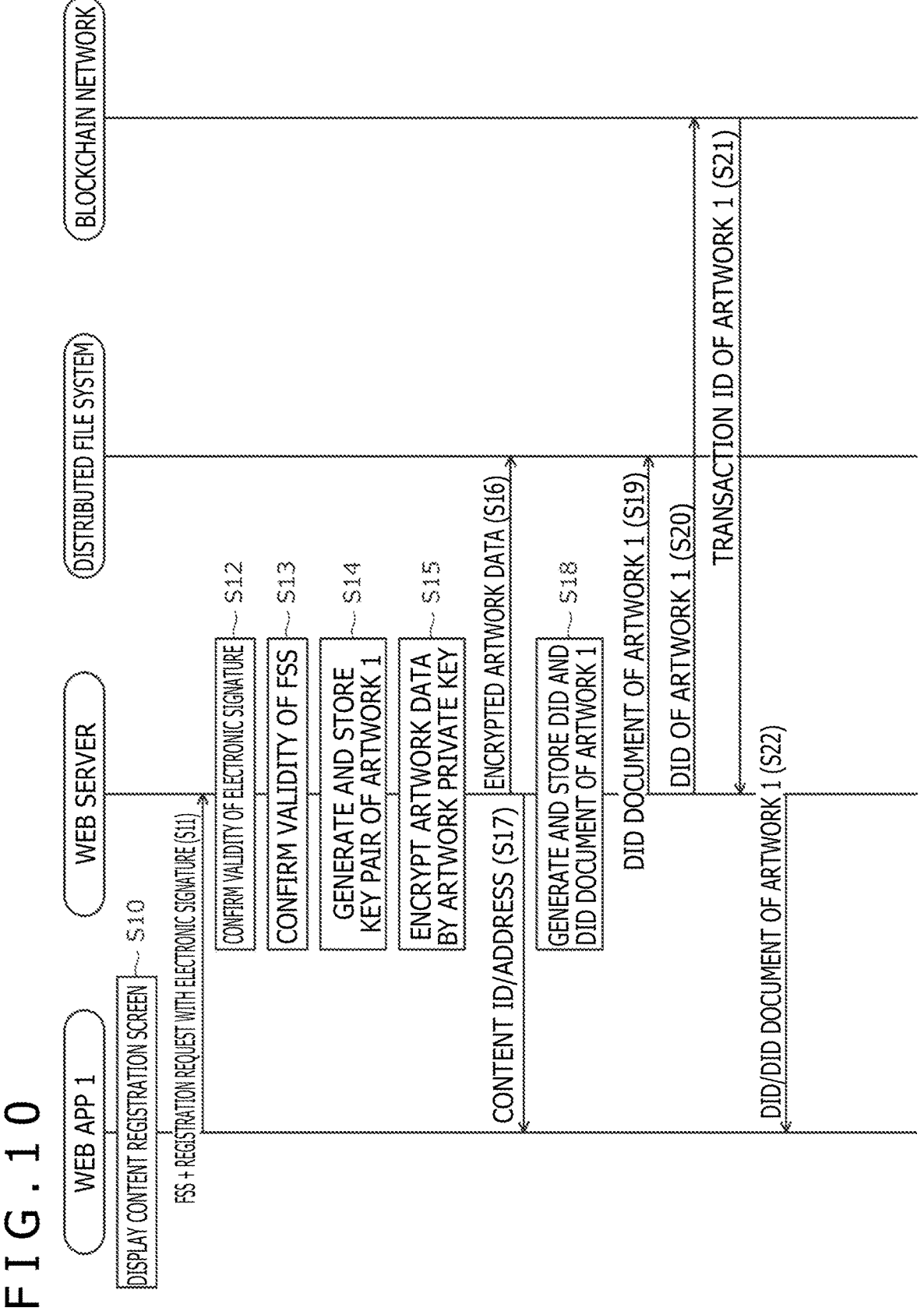
FIG. 10 is a sequence diagram illustrating processing related to the registration of the artwork 1.
Figure 11:
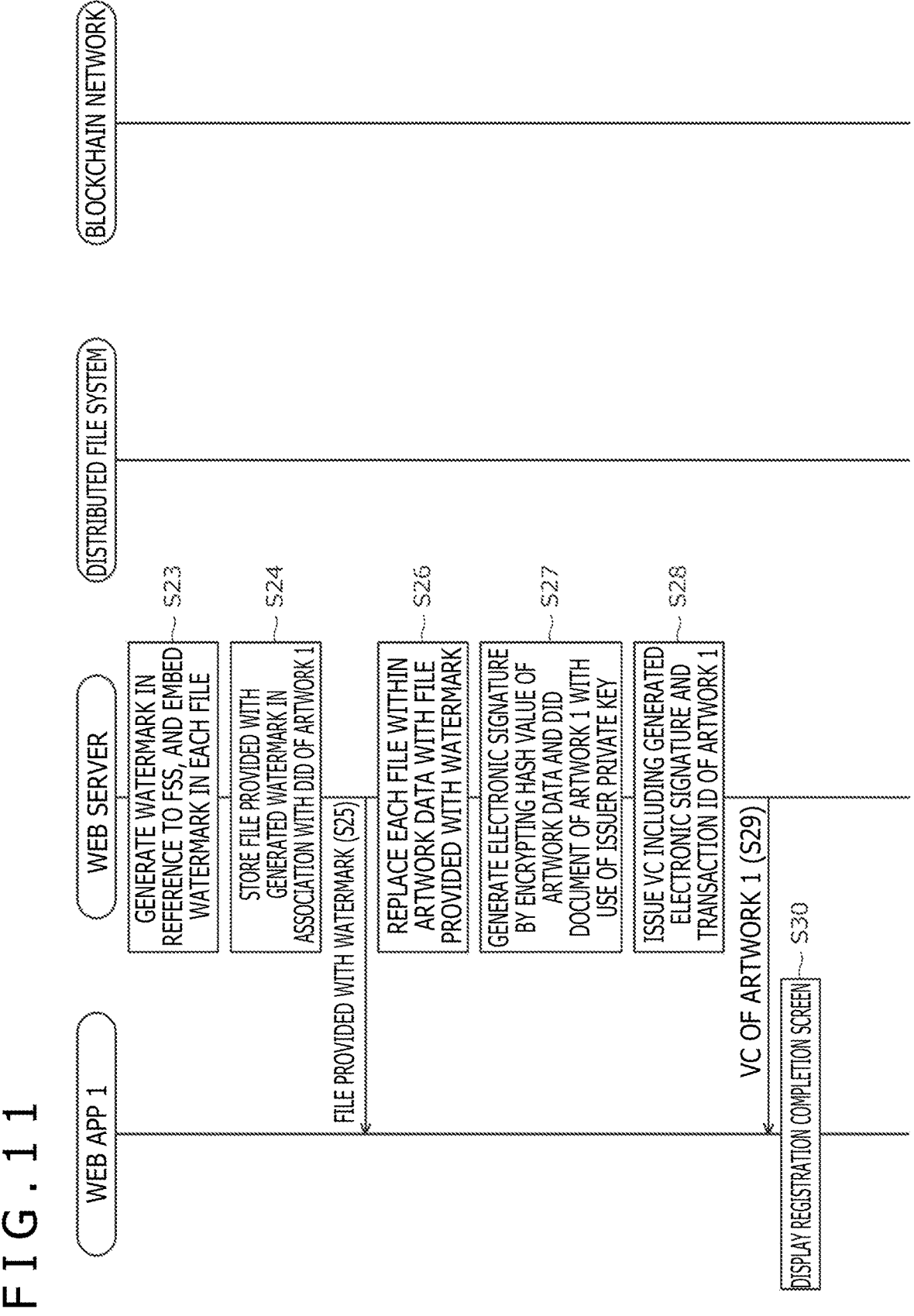
FIG. 11 is a sequence diagram illustrating processing related to the registration of the artwork 1.

FIG. 10 and FIG. 11 are each a sequence diagram illustrating processing related to the registration of the artwork 1. First, the Web app 3*a* displays the content registration screen illustrated in FIG. 6 (step S10). When the user selects the registration button 24 illustrated in FIG. 6, the Web app 3*a* displays the signature window 25 illustrated in FIG. 7, and then transmits a request to register the artwork 1 to the Web server 4 (step S11). This registration request includes the DID of the artist 1 which is stored by the Web app 3*a* in step S7 in FIG. 9; each file (selected in the selection interface 22 illustrated in FIG. 6) constituting the artwork 1; the metadata of the artwork 1 (information including the name input to the content name input section 21 illustrated in FIG. 6 and each piece of information input in the metadata input interface 23 illustrated in FIG. 6); the biometric signature data generated based on the signature input by pen in the signature window 25 illustrated in FIG. 7; and the electronic signature of the artist 1. While "FSS" is illustrated as the biometric signature data in FIG. 10 and subsequent figures, biometric signature data other than FSS may of course be used. In addition, the Web app 3*a* is configured to generate the electronic signature of the artist 1 by encrypting the hash value of the data constituting the registration request (excluding the electronic signature) with the private key of the user.

Receiving the registration request for the artwork 1, the Web server 4 first confirms the validity of the electronic signature and the biometric signature data (steps S12 and S13). Here, it suffices to confirm the validity of the electronic signature by decrypting the electronic signature included in the registration request, with the public key of the user, and deriving the hash value of the data constituting the registration request (excluding the electronic signature), and making a comparison therebetween. In addition, it suffices to confirm the validity of the biometric signature data by extracting one or more pieces of dynamic signature data corresponding to the user DID included in the registration request from a database storing the one or more pieces of dynamic signature data in association with the user DID, and comparing the one or more pieces of dynamic signature data with the dynamic signature data included in the biometric signature data. When the validity of the biometric signature data is confirmed as a result of this comparison, the Web server 4 preferably adds the dynamic signature data included in the registration request, as new dynamic signature data of the user, in the database.

Next, the Web server 4 generates and stores a key pair of the artwork 1 (step S14). In the following, a private key included in the key pair generated here will be referred to as an "artwork private key," and a public key included in the key pair generated here will be referred to as an "artwork public key." Subsequently, the Web server 4 encrypts the artwork data (data including each file constituting the artwork 1 and the metadata) with the generated artwork private key and registers the artwork data with the distributed file system 5 (step S15), and transmits the content ID and the address described above that are obtained as a result of the registration to the Web app 3*a* (step S17).

Next, the Web server 4 generates and stores the DID of the artwork 1 and a DID document including the whole or part of the metadata of the artwork 1 (step S18). Then, the Web server 4 registers the generated DID document with the distributed file system 5 (step S19), and issues a smart contract for recording the generated DID in the blockchain to the blockchain network 6 (step S20). When the recording of the DID in the blockchain is completed, the blockchain network 6 issues a transaction ID. The Web server 4 receives the transaction ID (transaction ID of the artwork 1) from the blockchain network 6, and stores the transaction ID (step S21). In addition, the Web server 4 transmits the generated DID and the generated DID document of the artwork 1 also to the Web app 3*a* (step S22).

FIG. 12A is a diagram illustrating an example configuration of the DID document of the artwork 1 which is generated by the Web server 4 in step S18. As illustrated in the figure, the DID document of the artwork 1 can include respective pieces of information regarding an owner, a contributor, secondary creation, an IP share, a usage mode, a signature, a storage location, and a public key. The owner is a user who holds the ownership of the artwork 1 (artist 1 in this case). The contributor is an artist who contributed to the production of the artwork 1 (artist 1 in this case). Generally, the DID of the user which is included in the registration request is set for each of the owner and the contributor. However, each of the owner and the contributor may be allowed to be specified individually by the user on the content registration screen illustrated in FIG. 6. Information in the metadata included in the registration request is set for the secondary creation, the IP share, and the usage mode. Other kinds of metadata may of course be set within the DID document of the artwork 1. Set as the signature is the hash value of the biometric signature data included in the registration request (information indicating the dynamic signature data included in the biometric signature data). Set as the storage location is the address obtained when the Web server 4 registers the artwork data with the distributed file system 5 in step S15. Set as the public key is the artwork public key generated by the Web server 4 in step S14.

Described next with reference to FIG. 11, the Web server 4 generates a watermark based on the biometric signature data included in the registration request (or the dynamic signature data included in the biometric signature data), and embeds the watermark in each file constituting the artwork 1 (step S23). Specifically, the biometric signature data or the dynamic signature data itself may be set as the watermark, or the hash value of the biometric signature data or the dynamic signature data may be set as the watermark. Then, the Web server 4 stores each watermarked file embedded with the watermark, in association with the DID of the artwork 1 (step S24), and transmits each watermarked file to the Web app 3a (step S25). Each file stored in step S24 is used when the file is displayed on the registration completion screen illustrated in FIG. 8, an artwork detail screen illustrated in FIG. 14 to be described later, or the like.

Next, the Web server 4 replaces each file within the artwork data with the watermarked file (step S26), and thereafter generates an electronic signature by encrypting the hash value of data including the artwork data and the DID document of the artwork 1 with use of the private key of the Web server 4 (the private key will hereinafter be referred to as an "issuer private key") (step S27). Then, the Web server 4 issues a VC including the generated electronic signature and the transaction ID of the artwork 1 which is received from the blockchain network 6 (step S28), and transmits the VC to the Web app 3a (step S29).

FIG. 12B is a diagram illustrating content of the VC for the artwork 1. As illustrated in the figure, the VC includes an issuance date, an issuer, the electronic signature of the issuer, and a transaction ID. Set as the issuance date is a date of issuance of the VC by the Web server 4. Set as the issuer is information (a name, an address, and the like) that identifies the Web server 4 that has issued the VC. The electronic signature generated in step S27 is set as the electronic signature of the issuer. Set as the transaction ID is the transaction ID of the artwork 1 which is received from the blockchain network 6.

The description returns to FIG. 11. Receiving the VC from the Web server 4, the Web app 3a generates and displays the registration completion screen illustrated in FIG. 8 (step S30). The series of registration processing is thereby completed.

FIG. 13 is a flowchart illustrating a flow of processing performed by a computer that receives the artwork data and the VC of the artwork 1 via the SNS or the sales site. This computer may be the artist terminal 3 illustrated in FIG. 1, or may be another computer. In the following, specific uses of the VC of the artwork 1 will be described with reference to FIG. 13.

The computer obtains the VC of the artwork 1 together with the artwork data disclosed on the SNS or the sales site (one or more watermarked files and metadata constituting the artwork 1) (step S40). Next, the computer obtains the DID of the artwork 1 from the blockchain network 6 based on the transaction ID included in the VC (step S41), and further obtains the DID document of the artwork 1 from the distributed file system 5 based on the obtained DID of the artwork 1 (step S42).

Next, the computer derives the hash value of data including the artwork data obtained in step S40 and the DID document of the artwork 1 which is obtained in step S42 (step S43). In addition, the computer obtains the public key of the issuer that issued the VC (the public key will hereinafter be referred to as an "issuer public key"), based on information regarding the issuer which is included in the VC (step S44), and decrypts the electronic signature within the VC with the obtained issuer public key (step S45). Then, the computer compares the hash value obtained by the decryption with the hash value derived in step S43 (step S46). When these hash values coincide with each other, it means that the authenticity of the disclosed artwork data is confirmed. It is thus possible to confirm the authenticity of the disclosed artwork data by performing verification with use of the VC.

Description has been made above of an example in which the computer that performs the verification of the VC obtains the DID document of the artwork 1 from the distributed file system 5. However, the DID document may also be disclosed together with the artwork data of the artwork 1 on the SNS or the sales site. In this case, it suffices to use the disclosed DID document in deriving the hash value in step S43 and, therefore, the transaction ID of the artwork 1 does not have to be disposed in the VC.

Figure 14:
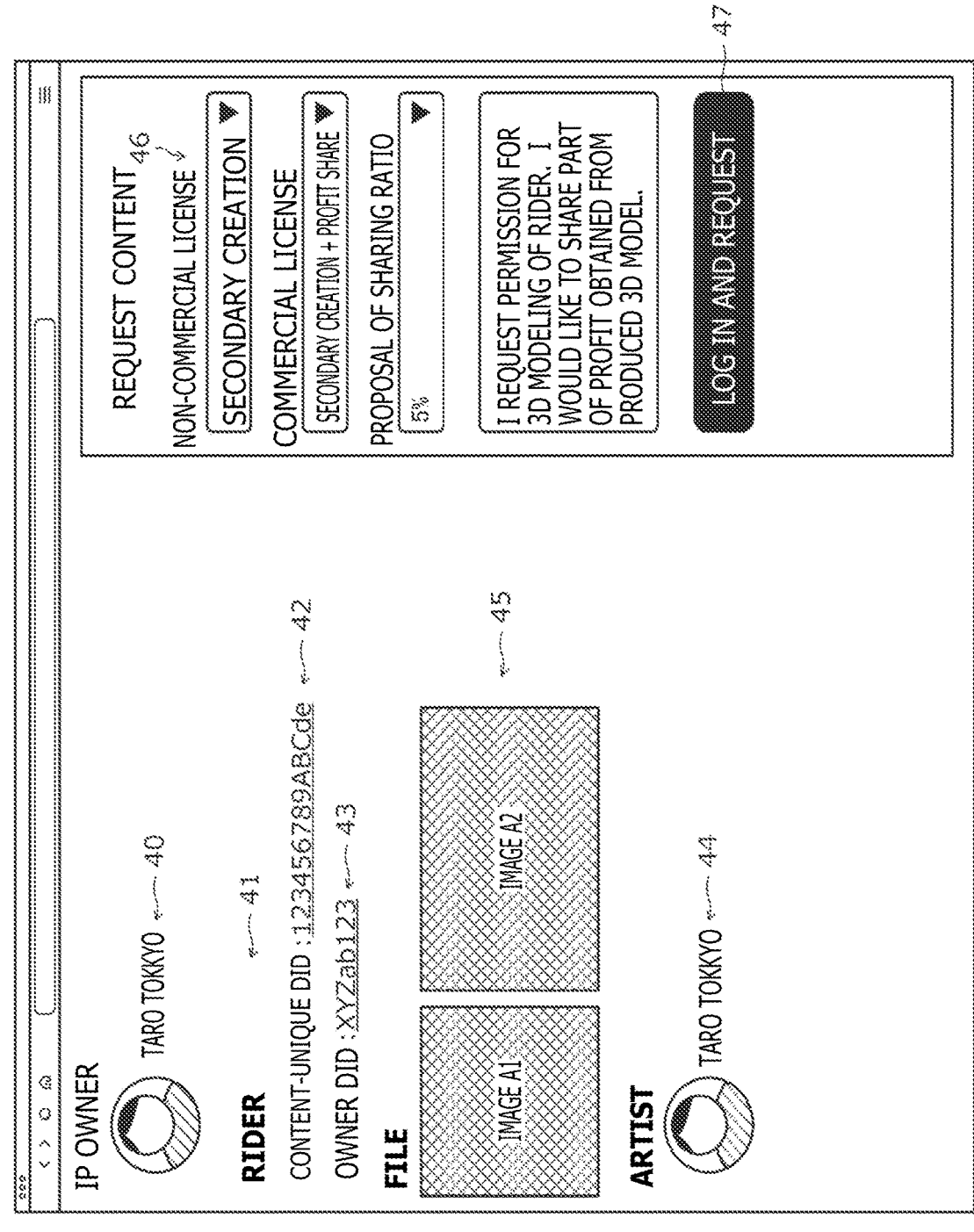
FIG. 14 is a diagram illustrating a sample screen of a Web app 3*a* displayed on the display of an artist terminal 3, on which a usage request for the artwork 1 is made.
Figure 16:
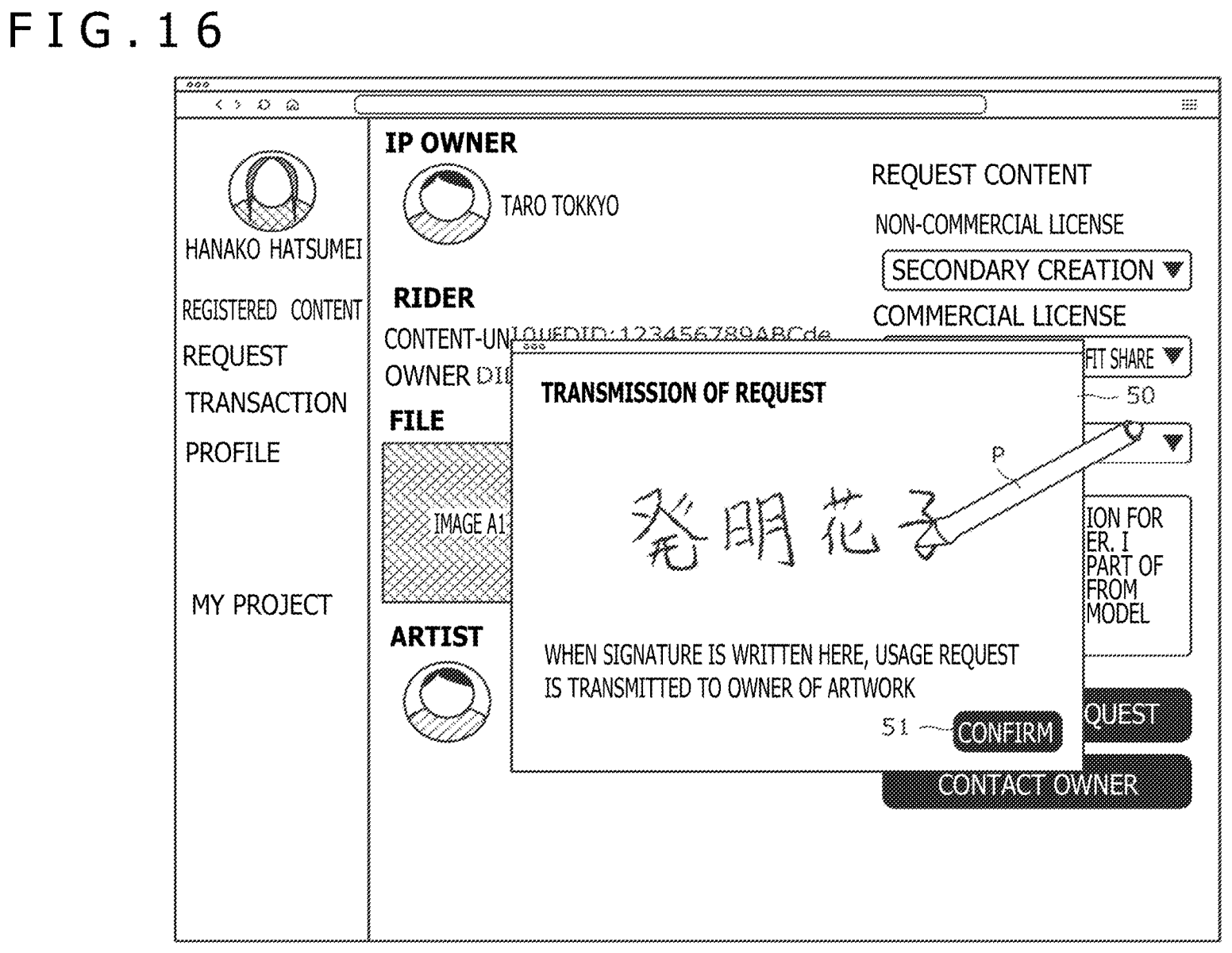
Figure 18:
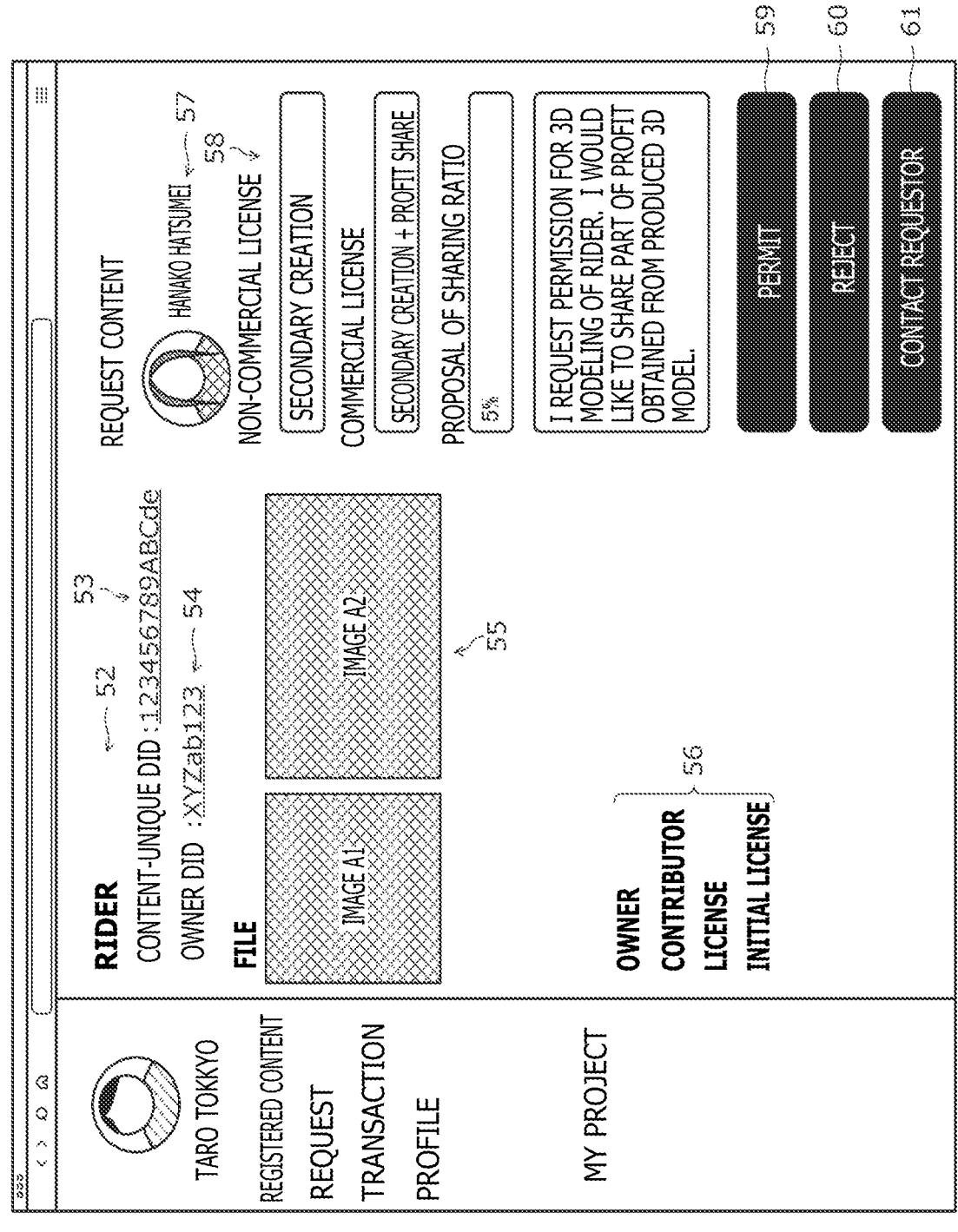
FIG. 18 is a diagram illustrating a sample screen of the Web app 3*a* displayed on the display of the artist terminal 3, on which the usage request for the artwork 1 is made.

Next, processing related to a usage request made by the artist 2 for the artwork 1 will be described. FIG. 14, FIG. 15, and FIG. 18 represent sample screens of the Web app 3a which are displayed on the display of the artist terminal 3, on which a usage request for the artwork 1 is made. In addition, FIG. 16 and FIG. 17 represent sample screens of the Web app 3a which are displayed on the display of the artist terminal 3, which has received the usage request for the artwork 1.

The screen illustrated in FIG. 14 is an artwork detail screen that is displayed when the artist 2 selects the artwork 1 on an artwork list display screen. As illustrated in the figure, this artwork detail screen includes display sections 40 to 45 including information related to the artwork 1, a request content input interface 46, and a request button 47.

The display section 40 displays owner information (a photograph, a name, and the like) of the artwork 1. The display section 41 displays the content name of the artwork 1. The display section 42 displays the DID of the artwork 1. The display section 43 displays the DID(s) of one or more users as the owner(s) of the artwork 1. The display section 44 displays information (a photograph(s), a name(s), and the like) of one or more users as the contributor(s) of the artwork 1. In order to display these pieces of information, the Web server 4 is configured to obtain the data to be displayed in the display sections 40 to 44, by obtaining the DID document of the artwork 1 from the DID of the artwork 1, and further obtaining respective DID documents from the DIDs of the owner(s) and the contributor(s) described in the DID document of the artwork 1. In addition, the display section 45 displays the thumbnail of the watermarked file stored in step S24 in FIG. 11.

The request content input interface 46 is an interface for inputting the content of a request which is directed to the owner of the artwork 1. Specific content of the request input here can include the content of a non-commercial license, the content of a commercial license, a proposal of a profit share ratio, and any text messages, as illustrated in FIG. 14.

FIG. 14 illustrates a state in which the artist 2 has not yet logged in to the Web app 3a. When the user selects the request button 47 in this state, the Web app 3a displays the login screen illustrated in FIG. 4, to prompt the artist 2 perform the login processing. When a login is successful, the Web app 3a displays a request transmission screen illustrated in FIG. 15.

The request transmission screen is a screen displayed when the artist 2 is logged in to the Web app 3a. Thus, as in FIG. 5, the request transmission screen has a side menu on a left side. The content of information displayed in the side menu is as described with reference to FIG. 5. On the right side of the side menu, the display sections 40 to 45 and the request content input interface 46 described with reference to FIG. 14 are again displayed, and a request transmission button 48 and a contact button 49 are displayed anew.

The contact button 49 is a push button for contacting the owner of the artwork 1 separately from the usage request. Detecting selection of the contact button 49, the Web app 3a displays an electronic mail input screen, and in response to selection of a transmission button displayed on the screen by the artist 2 transmits an electronic mail to an email address of the owner of the artwork 1. While an example using an electronic mail is described here, such communicating means as an SNS other than the electronic mail may of course be used. In that case, information regarding the SNS account of the owner of the artwork 1 needs to be stored in advance as part of the user information of the owner of the artwork 1.

The request transmission button 48 is a push button for actually transmitting the usage request for the artwork 1 to the owner of the artwork 1. Detecting selection of the request transmission button 48, the Web app 3a displays a signature window 50 illustrated in FIG. 16. The signature window 50 is an interface similar to the signature window 25 illustrated in FIG. 7. The signature window 50 includes an interface for the artist 2 to input a handwritten signature by using the pen P and a confirmation button 51. When the artist 2 who has input the signature selects the confirmation button 51, the Web app 3a generates the biometric signature data illustrated in FIG. 3 based on the input signature, and then transmits a usage request illustrated in FIG. 20 to be described later to the Web server 4. As will be described later in detail, in response to this usage request, the Web server 4 performs processing of notifying the owner about the usage request, processing of obtaining agreed content according to an approval result of the owner, processing of generating the DID and the DID document of a project related to the usage request and registering the DID document with the distributed file system 5 while recording the DID in the blockchain network 6, and processing of generating a VC for certifying the authenticity of the project.

FIG. 17 represents a request list screen (a screen displayed by selecting the link 16 within the side menu) displayed by the Web app 3a of the artist terminal 3 that has received a notification of the usage request (the artist terminal 3 of the artist 1 as the owner of the artwork 1). In the present example, as the usage request received from another computer, one request for "Rider" is displayed within the screen.

Here, as illustrated in FIG. 17 for example, specific content of the usage request displayed within the request list screen includes a date of transmission of the usage request, a status of the usage request (pending, permitted, rejected, and so forth), data identifying the artwork 1 as a request target (the content name, the thumbnail of a file constituting the artwork 1, and the like), an requestor, and a request ID. Of these, the request ID is information identifying the usage request, and is given by the Web server 4 for each transmission of the usage request. Other information, for example, information constituting the metadata of the artwork 1 or the like may of course be displayed.

The request ID serves as a hyperlink to a usage request detail screen illustrated in FIG. 18. When the user clicks this hyperlink, the Web app 3a displays the usage request detail screen illustrated in FIG. 18. As illustrated in FIG. 18, the usage request detail screen includes display sections 52 to 58, a permission button 59, a rejection button 60, and a contact button 61.

The display section 52 displays the content name of the artwork 1. The display section 53 displays the DID of the artwork 1. The display section 54 displays the DID of the user as the owner of the artwork 1. The display section 55 displays the thumbnail(s) of one or more watermarked files constituting the artwork 1. The display section 56 displays the whole or part of the metadata of the artwork 1. The display section 57 displays information (a photograph, a name, and the like) of the requestor. The display section 58 displays the content of the request (information input to the request content input interface 46 illustrated in FIG. 15).

The contact button 61 is a push button for contacting the requestor. Detecting selection of the contact button 61, as in a case of detecting selection of the contact button 49 illustrated in FIG. 15, the Web app 3a displays an electronic mail input screen, and in response to selection of a transmission button displayed on the screen by the user, transmits an electronic mail to the email address of the owner of the artwork 1. As described in relation to the contact button 49, other communicating means may be used in place of the electronic mail.

The permission button 59 is a push button for accepting the usage request. On the other hand, the rejection button 60 is a push button for rejecting the usage request. Detecting selection of one of the buttons, the Web app 3a transmits information (permission or rejection) corresponding to the selected button to the Web server 4. Processing performed by the Web server 4 in response to this information will be described later.

FIG. 19 is a diagram illustrating an example of a request list screen, displayed by the Web app 3a of the artist 2 who has made the request, as a result of the processing performed by the Web server 4. In the present example, as a result of the owner permitting the usage request, a displayed status is "permitted." In this case, as illustrated in FIG. 19, a download button 62 for downloading each file constituting the artwork 1 is displayed in the vicinity of a request ID, for example. Operation of the Web app 3a in a case where the user selects the download button 62 will be described later.

Figure 20:
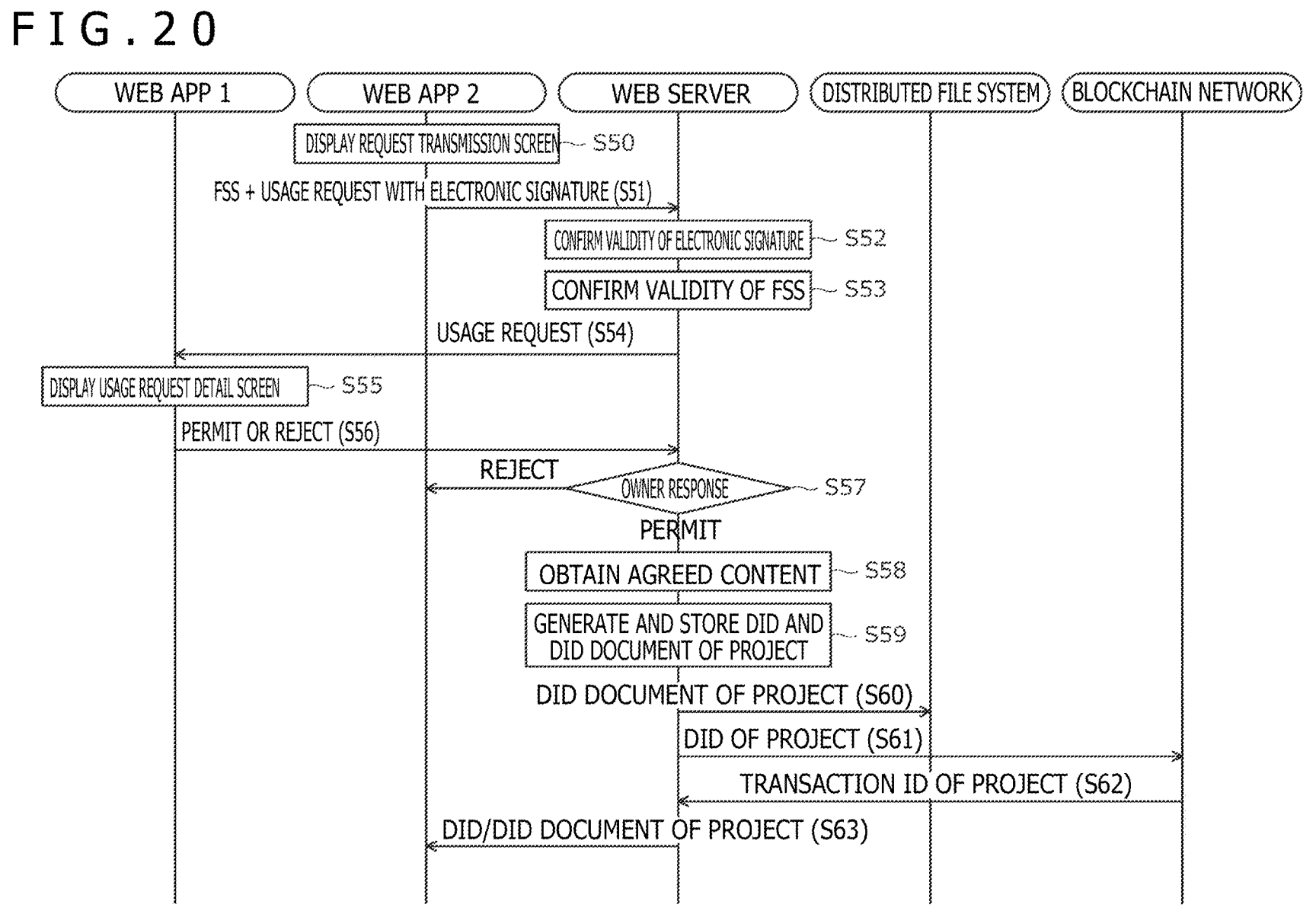

FIG. 20 and FIG. 21 are a sequence diagram illustrating processing related to the usage request for the artwork 1. A "Web app 1" illustrated in these figures represents the Web app 3a operating on the artist terminal 3 of the artist 1 as the owner of the artwork 1. A "Web app 2" illustrated in these figures represents the Web app 3a operating on the artist terminal 3 of the artist 2 as the requestor.

First, the Web app 3a displays the request transmission screen illustrated in FIG. 15 (step S50). When the user selects the request transmission button 48 illustrated in FIG. 15, the Web app 3a displays the signature window 50 illustrated in FIG. 16, and thereafter transmits a usage request for the artwork 1 to the Web server 4 (step S51). This registration request includes the DID of the artist 2 as the requestor, the DID of the artwork 1, the DID of the artist 1 as the owner of the artwork 1, the information input to the request content input interface 46 illustrated in FIG. 15, biometric signature data generated based on the signature input in the signature window 50 illustrated in FIG. 16, and the electronic signature of the artist 2. The Web app 3a generates the electronic signature of the artist 2 by encrypting the hash value of the data constituting the usage request (excluding the electronic signature) with the private key of the user.

Receiving the usage request for the artwork 1, the Web server 4 first confirms the validity of the electronic signature and the biometric signature data (steps S52 and S53). Details of the respective steps are similar to those described with reference to steps S12 and S13 in FIG. 10.

Next, the Web server 4 transmits the usage request to the Web app 3a of the artist 1 as the owner of the artwork 1 (step S54). Thus receiving the usage request, the Web app 3a displays the received usage request within the request list screen, as illustrated in FIG. 17, and in response to the clicking of the request ID in the request list screen by the artist 1, displays the usage request detail screen illustrated in FIG. 18 (step S55). Then, the Web app 3a transmits information indicating "permission" to the Web server 4 when the artist 1 selects the permission button 59, or the Web app 3a transmits information indicating "rejection" to the Web server 4 when the artist 1 selects the rejection button 60 (step S56).

The Web server 4 determines which of permission or rejection is indicated by the information (response from the owner) received from the Web app 3a of the owner of the artwork 1 (step S57). When a rejection is indicated, the Web server 4 transmits information indicating the rejection to the Web app 3a of the artist 2 who is the requestor. In this case, "rejected" is displayed in the status section of the corresponding usage request on the request list screen illustrated in FIG. 19. When a permission is indicated, on the other hand, the Web server 4 obtains content agreed between the requestor and the owner (generally, information input to the request content input interface 46 illustrated in FIG. 15; however, the content may be changed thereafter by the requestor or the owner) (step S58).

Next, the Web server 4 sets a new project related to the usage request, and generates and stores a DID and a DID document of the set project (step S59). Then, the Web server 4 registers the generated DID document with the distributed file system 5 (step S60), and issues a smart contract for recording the generated DID in the blockchain to the blockchain network 6 (step S61). When the recording of the DID in the blockchain is completed, the blockchain network 6 issues a transaction ID. The Web server 4 receives this transaction ID (transaction ID of the project) from the blockchain network 6 and stores the transaction ID (step S62). In addition, the Web server 4 transmits the generated DID and the generated DID document of the project also to the Web app 3a of the requestor (step S63).

FIG. 22A is a diagram illustrating an example of a configuration of the DID document of the project which is generated by the Web server 4 in step S59. As illustrated in the figure, the DID document of the project can include respective pieces of information concerning an owner, a signature, a target work, and a usage condition. Set as the owner is the DID of the requestor (artist 2 in this case) included in the usage request. Set as the signature is the hash value of the biometric signature data included in the usage request. Set as the target work is the DID of the artwork 1 as a target of the usage request. Set as the usage condition is information indicating the agreed content obtained in step S58.

Next, referring to FIG. 21, the Web server 4 generates an electronic signature by encrypting the hash value of the DID document of the project with use of the issuer private key (step S64). Then, the Web server 4 issues a VC (verifiable certificate) including the generated electronic signature and the transaction ID of the project which is received from the blockchain network 6 (step S65), and transmits the VC to the Web app 3a of the requestor (step S66).

FIG. 22B is a diagram illustrating the content of the VC for the project. As in the VC of the artwork 1 illustrated in FIG. 12B, this VC also includes an issuance date, an issuer, the electronic signature of the issuer, and a transaction ID. The set content of the issuance date, the issuer, and the electronic signature of the issuer is similar to the set content of the VC of the artwork 1. Set as the transaction ID is the transaction ID of the project which is received from the blockchain network 6. However, the VC of the project does not have to include the transaction ID.

The description returns to FIG. 21. Receiving the VC of the project, the Web app 3a displays the request list screen illustrated in FIG. 19 (step S67). In this case, "permitted" is displayed in the status section of the corresponding usage request. Detecting selection of the download button 62 on the request list screen illustrated in FIG. 19, the Web app 3a displays the DID and the DID document of the project that are received in step S63, displays the VC of the project that is received in step S63, and displays a download page for each file constituting the artwork 1. The artist 2 as the requestor thus is allowed to use each piece of information.

FIG. 23 is a flowchart illustrating a flow of processing performed by the computer that receives the DID document and the VC of the project via the SNS or the sales site. This computer may be the artist terminal 3 illustrated in FIG. 1, or may be another computer. In the following, specific uses of the VC of the project will be described with reference to FIG. 23.

The computer obtains the VC of the project together with the DID document of the project which is disclosed on the SNS or the sales site (step S70). Next, the computer derives the hash value of the obtained DID document (step S71). In addition, the computer obtains the issuer public key based on the information of the issuer which is included in the VC (step S72), and decrypts the electronic signature within the VC with the obtained issuer public key (step S73). Then, the computer compares the hash value obtained by the decryption with the hash value derived in step S74 (step S74). When these hash values coincide with each other, it means that the authenticity of the disclosed DID document (and the agreed content included in the DID document) is confirmed. By performing verification with use of the VC, it is thus possible to confirm the authenticity of the content agreed between the owner of the artwork 1 and the requestor who has made the usage request.

Finally, description will be made of processing related to the registration of the artwork 2 produced based on the artwork 1. FIGS. 24 to 26 are sample screens of the Web app 3a displayed on the display of the artist terminal 3, on which registration of the artwork 2 is performed. When the artist 2 as the user of the artist terminal 3 selects the link 19 within the side menu, the Web app 3a displays the my-project screen described above. When the artist 2 selects a project related to the artwork 1 on the my-project screen, the Web app 3a displays a content registration screen illustrated in FIG. 24.

The content registration screen illustrated in FIG. 24 includes a content name input section 70, an original work display section 71, a file selection interface 72, an artwork metadata input interface 73, and a registration button 74.

The content name input section 70 is a text box for inputting the name of the artwork 2 freely named by the user. In FIG. 6, "Rider," which is the same as that of the artwork 1, is input to the content name input section 70. However, a name different from the name of the artwork 1 may be input to the content name input section 70. The original work display section 71 displays information (a content name, a content ID, a thumbnail, and the like) indicating the target work of the project (the target work will hereinafter be referred to as an "original work").

The selection interface 72 is an interface for selecting a file(s) of the artwork that the user intends to register here-after. As in the selection interface 22 illustrated in FIG. 6, the file(s) selected here is (are), for example, an image file(s) such as a jpg file(s) or a png file(s) or a folder including a plurality of files. FIG. 24 illustrates a state in which one folder F1 and one image B1 are selected. The image B1 is, for example, a 3D (Three Dimensional) model of a person included in the image A2. The folder F1 can include, for example, one or more image files constituting a texture (3D texture) used to display the image B1. Each file within the folder F1 constitutes the artwork 2 together with the image B1.

The metadata input interface 73 is an interface for input-ting metadata as information for describing the artwork 2. As will be described later, the artwork 2 is to be shared with the owner of the artwork 1, and therefore part of the metadata cannot be edited. On the other hand, other metadata can be input. FIG. 24 illustrates content of contribution by the artist 2 and an IP setting as an example of such metadata.

When the user selects the registration button 74, the Web app 3a displays a signature window 75 illustrated in FIG. 25. The signature window 75 is an interface similar to the signature window 25 illustrated in FIG. 7 and the signature window 50 illustrated in FIG. 16. The signature window 75 includes an interface for the user to input a handwritten signature by using the pen P and a confirmation button 76. When the user who has input the signature selects the confirmation button 76, the Web app 3a generates the biometric signature data illustrated in FIG. 3 based on the input signature, and then transmits a registration request illustrated in FIG. 28 to be described later to the Web server 4. As will be described later in detail, in response to the registration request, the Web server 4 performs processing of registering the artwork 2 with the distributed file system 5, processing of generating a DID and a DID document of the artwork 2 and registering the DID document with the distributed file system 5 while recording the DID in the blockchain network 6, processing of generating a VC for certifying the authenticity of the artwork 2, and processing of embedding a watermark in each file constituting the artwork 2.

FIG. 26 is a registration completion screen displayed by the Web app 3a after completion of the series of processing performed by the Web server 4. As illustrated in the figure, the registration completion screen includes display sections 77 to 83 for displaying predetermined information and operation buttons 84 to 87 for performing predetermined operations.

The display section 77 displays the DID of the artwork 2 which is recorded in the blockchain network 6 by the Web server 4. The display section 78 displays the thumbnails of files constituting the artwork 2 in a list. Clicking the thumb-nails, the user can download the corresponding files. The files downloaded in this case are watermarked files to be described later. The display section 79 displays information (a content name, a content ID, a thumbnail, and the like) indicating the original work. The display section 80 displays information (a photograph(s), a name(s), and the like) of one or more artists (in this case the artist 1 and the artist 2) involved in the production of the artwork 2.

The display section 81 displays a content ID assigned when the Web server 4 registers the artwork 2 with the distributed file system 5. The content ID is specifically a hash value of artwork data including each file constituting the artwork 2 and the metadata. The display section 82 displays the address of the artwork 2 in the distributed file system 5. The display section 83 displays the whole or part of the metadata of the artwork 2.

The operation button 84 is a push button for updating the artwork 2. Detecting selection of the operation button 84, the Web app 3a displays a screen for adding, changing, or deleting a file constituting the artwork 2. In addition, the operation button 85 is a push button for changing the metadata of the artwork 2. Detecting selection of the opera-tion button 85, the Web app 3a displays a screen for changing the metadata of the artwork 2. When correspond-ing information on the screens displayed according to the selection of the operation buttons 84 and 85 is actually changed, etc., the Web app 3a again transmits a registration request to the Web server 4. Consequently, the artwork 2 registered with the distributed file system 5 is changed, a new DID is recorded in the blockchain network 6, a new VC is issued, and a new watermark is embedded in each file constituting the artwork 2.

The operation button 86 is a push button for uploading the artwork 2 to an SNS. In addition, the operation button 87 is a push button for uploading the artwork 2 to the sales site. Details of these operation buttons are similar to those of the operation buttons 35 and 36 described with reference to FIG. 8.

FIG. 27 represents an artwork detail screen that is dis-played when the user selects the artwork 2 on an artwork list display screen not illustrated in the figure. As illustrated in the figure, the artwork detail screen includes display sections 88 to 94 including information related to the artwork 2, a request content input interface 95, and a request button 96. Of these, details of the request content input interface 95 and the request button 96 are similar to those of the request content input interface 46 and the request button 47 described with reference to FIG. 14.

The display section 88 displays information (a photo-graph, a name, and the like) of the artist 2 who produced the artwork 2. Unlike the artwork detail screen illustrated in FIG. 14, the IP owner is not displayed here because the artist 2 alone does not constitute the owners of the artwork 2.

The display section 89 displays information (a content name, a content ID, a thumbnail, and the like) indicating the original work. The display section 90 displays the content name of the artwork 2. The display section 91 displays the DID of the artwork 2. The display section 92 displays the DID(s) of one or more users (the artist 1 and the artist 2 in this case) as the owner(s) of the artwork 2 (owner(s) set in the DID document of the artwork 2). The display section 93 displays information (a photograph(s), a name(s), and the like) of one or more users (the artist 1 and the artist 2 in this case) as the contributor(s) of the artwork 2 (contributor(s) set in the DID document of the artwork 2). A method by which the Web server 4 obtains these pieces of information is as described with reference to FIG. 14. The display section 94 displays the thumbnail of a watermarked file stored in step S94 in FIG. 29 to be described later.

FIGS. 28 to 30 are each a sequence diagram illustrating processing related to registration of the artwork 2. Specific content of processing of steps S80 to S87 in the processing illustrated in FIG. 28 are similar to those of the processing of steps S10 to S17 illustrated in FIG. 10 except that the artwork 1 is replaced with the artwork 2. However, the metadata of the artwork 2 which is included in a registration request is data generated by the Web app 3a based on the metadata input interface 73 illustrated in FIG. 24 and the agreed content set in the DID document of the corresponding project. As a result of the processing, the content ID and address of the artwork 2 are transmitted to the Web app 3*a* (step S87).

Completing step S87, the Web server 4 generates and stores the DID of the artwork 2 and a DID document including the whole or part of the metadata of the artwork 2 (step S88). Then, the Web server 4 performs the processing of steps S89 to S92. Specific content of the processing of steps S89 to S92 is also similar to the content of the processing of steps S19 to S22 illustrated in FIG. 10 except that the artwork 1 is replaced with the artwork 2. As a result of the processing, the DID and the DID document of the artwork 2 are transmitted to the Web app 3*a* (step S92).

FIG. 31A is a diagram illustrating an example configuration of the DID document of the artwork 2 which is generated by the Web server 4 in step S88. Constituent elements of the DID document of the artwork 2 are similar to those of the DID document of the artwork 1 illustrated in FIG. 12A, but content thereof is partially different. In particular, as the owners, both of the DID of the artist 1 as the owner of the artwork 1 and the DID of the artist 2 who produced the artwork 2 are set, together with respective ownership shares. In addition, as the contributors, the DID of the artist 1 and the DID of the artist 2 are set, together with the content of their respective contribution.

Described next with reference to FIG. 29, the Web server 4 performs the processing of steps S93 to S99. Specific content of the processing of steps S93 to S99 is similar to the content of the processing of steps S23 to S29 illustrated in FIG. 11 except that the artwork 1 is replaced with the artwork 2. As a result of the processing, each watermarked file and the VC of the artwork 2 are transmitted to the Web app 3*a* (steps S95 and S99).

FIG. 31B is a diagram illustrating content of the VC for the artwork 2. As is understood by a comparison with the VC illustrated in FIG. 12B, the VC for the artwork 2 has a configuration similar to that of the VC for the artwork 1. However, an electronic signature obtained by encrypting the hash value of data including the artwork data and the DID document of the artwork 2 with the private key of the issuer is set as the electronic signature of the issuer, and the transaction ID of the artwork 2 is set as a transaction ID.

Described next with reference to FIG. 30, the Web server 4 adds the DID of the artwork 2 to the DID document of the corresponding project, as illustrated in FIG. 30 (step S100). Based on the DID document to which the DID of the artwork 2 is added, the Web server 4 updates the stored DID document of the project, and also updates the DID document of the project which is stored in the distributed file system 5 (step S101). The Web server 4 also transmits the DID document obtained after the update to the Web app 3*a* (step S102).

FIG. 31C is a diagram illustrating the DID document of the project which is updated in step S101. As is understood by a comparison of the figure with FIG. 22B, a section of a derived work is added to the DID document obtained after the update, and the DID of the artwork 2 is set in the section. It is thus possible to manage the derived work generated according to the project, within the DID document of the project.

The description returns to FIG. 30. The Web server 4 next performs the processing of steps S103 to S105. Specific content of the processing of steps S103 to S105 is similar to the content of the processing of steps S64 to S66 illustrated in FIG. 21. As a result of the processing, a new VC of the project is transmitted to the Web app 3*a* (step S105).

Receiving the VC from the Web server 4, the Web app 3*a* generates and displays the registration completion screen illustrated in FIG. 26 (step S106). The series of registration processing is thereby completed.

As described above, according to the artwork management system 1 in accordance with the present embodiment, in response to reception of the usage request for the artwork 1, the Web server 5 generates the DID document of the project which includes the DID of the artwork 1 and the DID of the user who transmitted the usage request for the artwork 1. Thus, the information related to the artwork can appropriately be managed by SSI.

In addition, according to the artwork management system 1 in accordance with the present embodiment, relation between the artwork 1 as the original work and the artwork 2 as a work derived from the artwork 1 can be recognized by viewing the DID document of the project. For example, in a case where there is a picture including a person and a 3D model of the person is created, a two-dimensional artwork as the picture of the person is derived into a three-dimensional artwork. According to the DID document of the project generated by the artwork management system 1 according to the present embodiment, a process of evolution from the picture of the person to the 3D model can be managed. Furthermore, the authenticity of the DID document of the project can be ensured by performing verification based on the electronic signature within the VC distributed together with the DID document of the project. Hence, information related to the evolution from the artwork 1 as the original work to the artwork 2 can be managed appropriately by SSI.

In addition, because the content agreed between the owner of the artwork 1 and the artist who produced the artwork 2 is arranged in the DID document of the project, various kinds of information related to the project such as the license conditions of the artwork 1 can be managed by SSI with use of the DID document of the project.

In addition, in the DID document of the artwork 2, the DID of the artist 1 and the DID of the artist 2 are arranged, and information indicating respective shares and contribution content of the artist 1 and the artist 2 are arranged, so that these pieces of information can also be managed by SSI.

A preferred embodiment of the present disclosure has been described above. However, the present disclosure is not at all limited to such embodiments, and the present disclosure can naturally be carried out in various embodiments without departing from its principles.

For example, in the foregoing embodiment, description has been made of an example in which a DID and a DID document are generated for an artwork as a whole in response to a registration request. However, a DID and a DID document may be generated also for each file constituting the artwork. In addition, as with the DID and the DID document for the artwork as a whole, the generated DID and the generated DID document may be recorded in the blockchain network 6 and registered with the distributed file system 5.

In addition, in the foregoing embodiment, description has been made of an example in which a VC for certifying the authenticity of artwork data is issued. However, VCs for certifying the authenticity of each file and biometric signature data may be issued.

DESCRIPTION OF REFERENCE SYMBOLS

1: Artwork management system
3: Artist terminal
3*a*: Web app

4: Web server
5: Distributed file system
6: Blockchain network
10: Email address input field
11: Password input field
12: Login button
13: Photograph
14: Name
15 to 19: Link
20, 24, 74: Registration button
21, 70: Content name input section
22, 72: File selection interface
23, 73: Metadata input interface
25, 50, 75: Signature window
26, 51, 76: Confirmation button
27 to 31, 40 to 45, 52 to 58, 77 to 83, 88 to 94: Display section
32 to 36, 84 to 87: Operation button
46, 95: Request content input interface
47, 96: Request button
48: Request transmission button
49, 61: Contact button
59: Permission button
60: Rejection button
62: Download button
71: Original work display section
100: Computer
102: Storage device
103: Input device
104: Output device
105: Communicating device
A1, A2, B1: Image
F1: Folder

The invention claimed is:

1. An artwork managing method performed by a computer, comprising:
receiving, by the computer, a request for usage of first artwork;
generating and issuing, by the computer, a first decentralized identity document including:
(i) a first decentralized identity, which is a decentralized identity for identifying the first artwork, and
(ii) a second decentralized identity, which is a decentralized identity for identifying a user requesting the usage of the first artwork;
recording, by the computer, the first decentralized identify and the second decentralized identity in a blockchain;
generating, by the computer, a first hash value based on the first decentralized identity document;
issuing, by the computer, a first certificate including the first hash value;
receiving, by the computer from outside the computer, the first certificate and a received first decentralized identity document;
generating, by the computer, a second hash value from the received first decentralized identity document;
comparing, by the computer, the second hash value with the first hash value included in the first certificate; and
when the second hash value matches the first hash value, confirming, by the computer, authenticity of the received first decentralized identity document.

2. The artwork managing method according to claim 1, wherein
the computer generates a first electronic signature based on the first decentralized identity document, and
the computer issues a first certificate including the first electronic signature.

3. The artwork managing method according to claim 2, wherein
the computer generates the first decentralized identity document, and generates a third decentralized identity linked to the first decentralized identity,
the computer receives a transaction identity generated in association with recording of the third decentralized identity in a blockchain, and
the first certificate includes the first electronic signature and the transaction identity.

4. The artwork managing method according to claim 1, wherein
the first decentralized identity document includes content agreed between an owner of the first artwork and the user.

5. The artwork managing method according to claim 1, wherein
the computer receives a registration request for second artwork produced based on the first artwork, and
the computer generates a fourth decentralized identity, which is a decentralized identity for identifying the second artwork, and generates a second decentralized identity document as a decentralized identity document including a fifth decentralized identity, which is a decentralized identity for identifying an artist of the second artwork.

6. The artwork managing method according to claim 5, wherein
the second decentralized identity document includes a sixth decentralized identity, which is a decentralized identity for identifying an artist of the first artwork.

7. The artwork managing method according to claim 6, wherein
the second decentralized identity document includes information indicating respective shares of the artist who produced the first artwork and the artist who produced the second artwork.

8. The artwork managing method according to claim 6, wherein
the second decentralized identity document includes information indicating respective contribution content of the artist who produced the first artwork and the artist who produced the second artwork.

9. The artwork managing method according to claim 6, wherein
the computer generates a second electronic signature based on data including artwork data constituting the second artwork and the second decentralized identity document, and
the computer issues a second certificate including the second electronic signature.

10. The artwork managing method according to claim 9, wherein
the second certificate includes a transaction identity issued when a second artwork decentralized identity is registered in a blockchain.

11. The artwork managing method according to claim 5, wherein
the registration request includes dynamic signature data as digital ink data generated by performance of a pen input, and
the first decentralized identity document includes information indicating the dynamic signature data.

12. The artwork managing method according to claim 11, wherein the computer generates a watermark based on the dynamic signature data, and embeds the watermark in each of one or more files constituting the second artwork.

13. The artwork managing method according to claim 5, wherein each of the first artwork and the second artwork includes digital ink data generated by performance of a pen input.

14. A computer configured to:

receive a request for usage of first artwork;

generate and issue a first decentralized identity document including:

(i) a first decentralized identity, which is a decentralized identity for identifying the first artwork, and ii) a second decentralized identity, which is a decentralized identity for identifying a user requesting the usage of the first artwork;

record the first decentralized identify and the second decentralized identity in a blockchain;

generate a first hash value based on the first decentralized identity document;

issue a first certificate including the first hash value;

receive, from outside the computer, the first certificate and a received first decentralized identity document;

generate a second hash value from the received first decentralized identity document;

compare the second hash value with the first hash value included in the first certificate; and when the second hash value matches the first hash value, confirm authenticity of the received first decentralized identity document.

15. The computer according to claim 14, wherein the computer generates a first electronic signature based on the first decentralized identity document, and the computer issues a first certificate including the first electronic signature.

16. The computer according to claim 15, wherein the computer generates the first decentralized identity document, and generates a third decentralized identity linked to the first decentralized identity, the computer receives a transaction identity generated in association with recording of the third decentralized identity in a blockchain, and the first certificate includes the first electronic signature and the transaction identity.

17. The computer according to claim 14, wherein the first decentralized identity document includes content agreed between an owner of the first artwork and the user.

18. The computer according to claim 14, wherein the computer receives a registration request for second artwork produced based on the first artwork, and the computer generates a fourth decentralized identity, which is a decentralized identity for identifying the second artwork, and generates a second decentralized identity document as a decentralized identity document including a fifth decentralized identity, which is a decentralized identity for identifying an artist of the second artwork.

19. The computer according to claim 18, wherein the second decentralized identity document includes a sixth decentralized identity, which is a decentralized identity for identifying an artist of the first artwork.

20. A non-transitory computer-readable medium including instructions causing a computer to perform:

receiving a request for usage of first artwork;

generating and issuing a first decentralized identity document including:

(i) a first decentralized identity, which is a decentralized identity for identifying the first artwork, and (ii) a second decentralized identity, which is a decentralized identity for identifying a user requesting the usage of the first artwork;

recording the first decentralized identify and the second decentralized identity in a blockchain;

generating a first hash value based on the first decentralized identity document;

issuing a first certificate including the first hash value;

receiving, from outside the computer, the first certificate and a received first decentralized identity document;

generating a second hash value from the received first decentralized identity document;

comparing the second hash value with the first hash value included in the first certificate; and when the second hash value matches the first hash value, confirming authenticity of the received first decentralized identity document.

21. The non-transitory computer-readable medium according to claim 20, including the instructions causing the computer to perform:

generating a first electronic signature based on the first decentralized identity document, and issuing a first certificate including the first electronic signature.

22. The non-transitory computer-readable medium according to claim 21, including the instructions causing the computer to perform:

generating the first decentralized identity document, and generating a third decentralized identity linked to the first decentralized identity, and receiving a transaction identity generated in association with recording of the third decentralized identity in a blockchain, wherein the first certificate includes the first electronic signature and the transaction identity.

23. The non-transitory computer-readable medium according to claim 20, wherein the first decentralized identity document includes content agreed between an owner of the first artwork and the user.

24. The non-transitory computer-readable medium according to claim 20, including the instructions causing the computer to perform:

receiving a registration request for second artwork produced based on the first artwork, and generating a fourth decentralized identity, which is a decentralized identity for identifying the second artwork, and generating a second decentralized identity document as a decentralized identity document including a fifth decentralized identity, which is a decentralized identity for identifying an artist of the second artwork.

25. The non-transitory computer-readable medium according to claim 24, wherein the second decentralized identity document includes a sixth decentralized identity, which is a decentralized identity for identifying an artist of the first artwork.

* * * * *